United States Patent
Iida

(10) Patent No.: US 9,798,962 B2
(45) Date of Patent: Oct. 24, 2017

(54) PRINTING APPARATUS AND COMPUTER PROGRAM PRODUCT FOR MANAGING SHEET ATTRIBUTE INFORMATION FOR PRINT JOBS

(71) Applicant: CANON KABUSHIKI KAISHA, Tokyo (JP)

(72) Inventor: Toshihiko Iida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/462,279

(22) Filed: Aug. 18, 2014

(65) Prior Publication Data

US 2015/0055175 A1 Feb. 26, 2015

(30) Foreign Application Priority Data

Aug. 22, 2013 (JP) .................................. 2013-172351
Apr. 11, 2014 (JP) .................................. 2014-082019

(51) Int. Cl.
*G06K 15/02* (2006.01)
*G06F 3/12* (2006.01)
(Continued)

(52) U.S. Cl.
CPC ....... *G06K 15/1823* (2013.01); *G06F 3/1204* (2013.01); *G06F 3/1205* (2013.01); *G06F 3/1207* (2013.01); *G06F 3/1253* (2013.01); *G06F 3/1254* (2013.01); *G06F 3/1258* (2013.01); *G06K 15/002* (2013.01); *G06K 15/4065* (2013.01); *H04N 1/00482* (2013.01);
(Continued)

(58) Field of Classification Search
None
See application file for complete search history.

(56) References Cited

U.S. PATENT DOCUMENTS 5,995,779 A * 11/1999 Natsume ............ G03G 15/6508
399/391
6,775,488 B2 * 8/2004 Sawada .................. G03B 27/52
399/45

(Continued)

FOREIGN PATENT DOCUMENTS

JP    2010-49167 A    3/2010
JP    2010-284919 A   12/2010

*Primary Examiner* — Scott A Rogers
(74) *Attorney, Agent, or Firm* — Canon U.S.A., Inc. IP Division

(57) ABSTRACT

A control apparatus includes a storing unit, a determining unit, a first notification unit, a selection unit, and a second notification unit. The storing unit stores attribute information of sheets to be stored in sheet holding units. The determining unit determines whether attribute information of sheets to be used by a job corresponds to the stored sheet attribute information. The first notification unit notifies, in a case where the determining unit determines that the attribute information does not correspond, a user that the attribute information does not correspond to the sheet attribute information. The selection unit selects the stored sheet attribute information to change the attribute information of sheets to be used by the job. The second notification unit notifies, in accordance with selection of the sheet attribute information, the user that the attribute information of sheets to be used by the job corresponds to the stored sheet attribute information.

18 Claims, 25 Drawing Sheets

(51) Int. Cl.
*H04N 1/00* (2006.01)
*H04N 1/23* (2006.01)
*G06K 15/00* (2006.01)

(52) U.S. Cl.
CPC ..... *H04N 1/00708* (2013.01); *H04N 1/00724* (2013.01); *H04N 1/00726* (2013.01); *H04N 1/00769* (2013.01); *H04N 1/00771* (2013.01); *H04N 1/00774* (2013.01); *H04N 1/00954* (2013.01); *H04N 1/00962* (2013.01); *H04N 1/2323* (2013.01); *H04N 1/2338* (2013.01); *H04N 1/2353* (2013.01); *H04N 1/2392* (2013.01); *G06K 15/1809* (2013.01)

(56) References Cited

U.S. PATENT DOCUMENTS

| | | | | |
|---|---|---|---|---|
| 6,850,337 | B1* | 2/2005 | Anderson | G06F 3/1207 358/1.12 |
| 7,151,610 | B2* | 12/2006 | Nagaso | H04N 1/00912 358/1.1 |
| 7,317,882 | B2* | 1/2008 | Dombrowski | G03G 15/6508 399/391 |
| 8,009,302 | B2* | 8/2011 | Martin | G06F 3/1204 358/1.13 |
| 8,179,559 | B2* | 5/2012 | Sawada | G03B 27/52 271/3.01 |
| 8,294,939 | B2* | 10/2012 | Fujimori | G06F 3/1205 358/1.1 |
| 8,451,496 | B2* | 5/2013 | Ohashi | G06F 3/1208 358/1.13 |
| 8,593,653 | B2* | 11/2013 | Fujimori | G06F 3/1205 358/1.1 |
| 8,599,391 | B2* | 12/2013 | Takahashi | G06F 3/1204 271/9.02 |
| 8,786,884 | B2* | 7/2014 | Maeda | G06F 3/1205 358/1.15 |
| 8,810,824 | B2* | 8/2014 | Takahashi | G03G 15/6508 358/1.12 |
| 9,013,751 | B2* | 4/2015 | Inui | G06K 15/02 358/1.12 |
| 9,019,522 | B2* | 4/2015 | Shibata | B41J 13/0018 358/1.14 |
| 9,239,977 | B2* | 1/2016 | Hibi | G06K 15/4065 |
| 9,350,886 | B2* | 5/2016 | Kanamoto | H04N 1/0048 |
| 9,430,722 | B2* | 8/2016 | Iida | G06F 3/1258 |
| 2002/0036799 | A1* | 3/2002 | Sumiyama | G06F 3/1205 358/1.15 |
| 2007/0189783 | A1* | 8/2007 | Hattori | G03G 15/553 399/16 |
| 2008/0084020 | A1* | 4/2008 | Nakamura | B41J 11/485 270/1.01 |
| 2009/0073476 | A1* | 3/2009 | Torikoshi | H04N 1/00236 358/1.13 |
| 2010/0157357 | A1* | 6/2010 | Torikoshi | G06F 3/1203 358/1.15 |
| 2012/0099148 | A1* | 4/2012 | Tokura | G06F 3/1205 358/1.15 |
| 2013/0099440 | A1* | 4/2013 | Hikichi | B41J 11/0075 271/9.06 |
| 2014/0268234 | A1* | 9/2014 | Iida | G06K 15/4065 358/1.15 |
| 2014/0341598 | A1* | 11/2014 | Kobayashi | G03G 15/5029 399/45 |
| 2014/0376023 | A1* | 12/2014 | Anno | G06K 15/4065 358/1.14 |
| 2015/0002881 | A1* | 1/2015 | Koike | G06F 3/1294 358/1.14 |
| 2015/0009533 | A1* | 1/2015 | Anno | G06F 3/1296 358/1.15 |
| 2015/0029558 | A1* | 1/2015 | Koike | G06K 15/1894 358/3.24 |
| 2015/0035221 | A1* | 2/2015 | Hikichi | B41J 11/0075 271/9.06 |
| 2015/0043035 | A1* | 2/2015 | Iida | G06F 3/1258 358/1.15 |
| 2015/0055175 | A1* | 2/2015 | Iida | G06K 15/1823 358/1.15 |
| 2015/0092237 | A1* | 4/2015 | Kanamoto | H04N 1/0048 358/1.16 |
| 2015/0160902 | A1* | 6/2015 | Tsujita | G06F 3/1257 358/1.6 |
| 2015/0160903 | A1* | 6/2015 | Mihira | G06F 3/1257 358/1.6 |
| 2015/0269461 | A1* | 9/2015 | Wakai | G06K 15/1868 358/1.6 |
| 2016/0039234 | A1* | 2/2016 | Hirai | G06F 3/1206 347/5 |
| 2016/0205281 | A1* | 7/2016 | Narita | G06F 3/1204 399/82 |

* cited by examiner

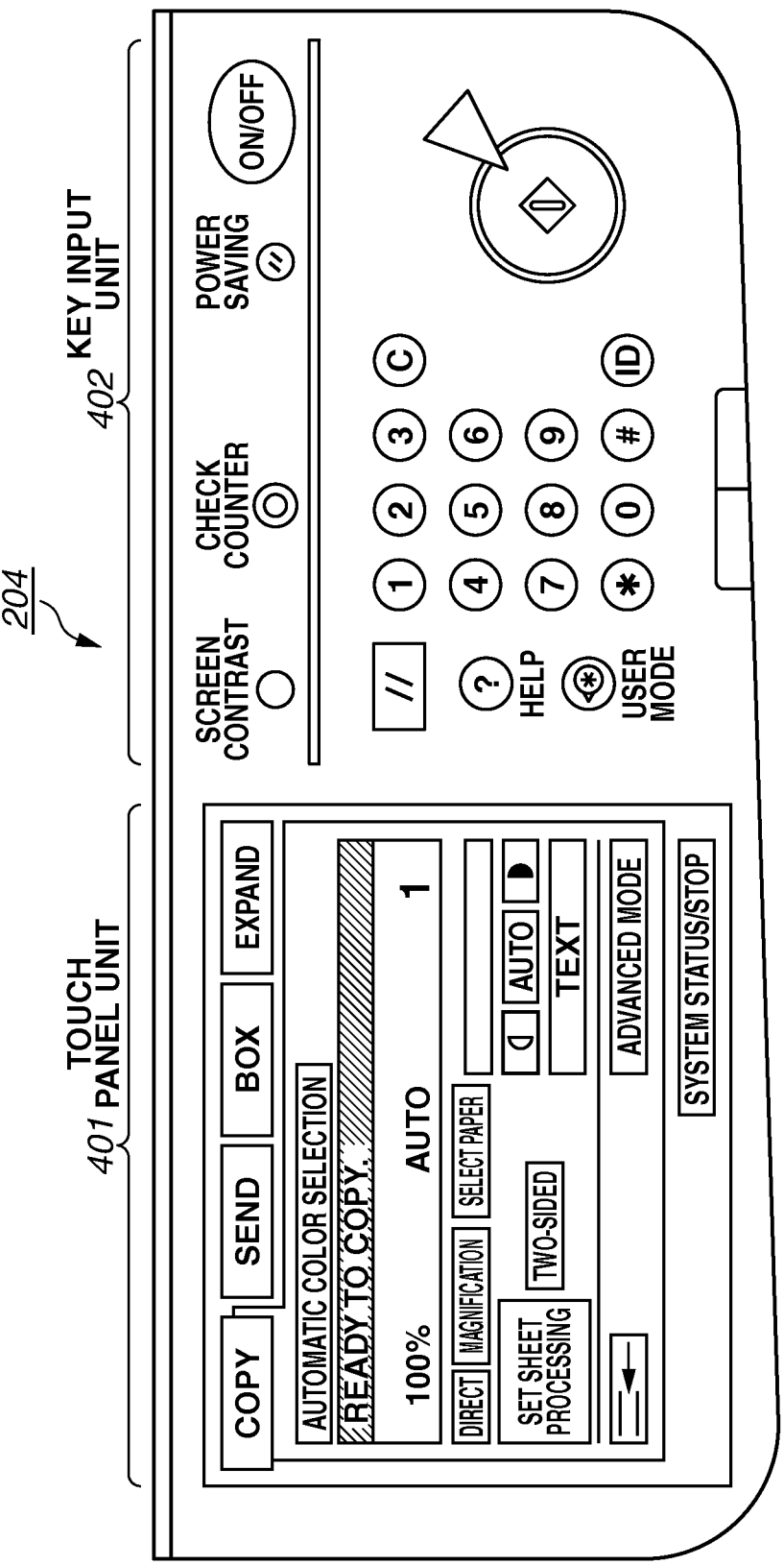

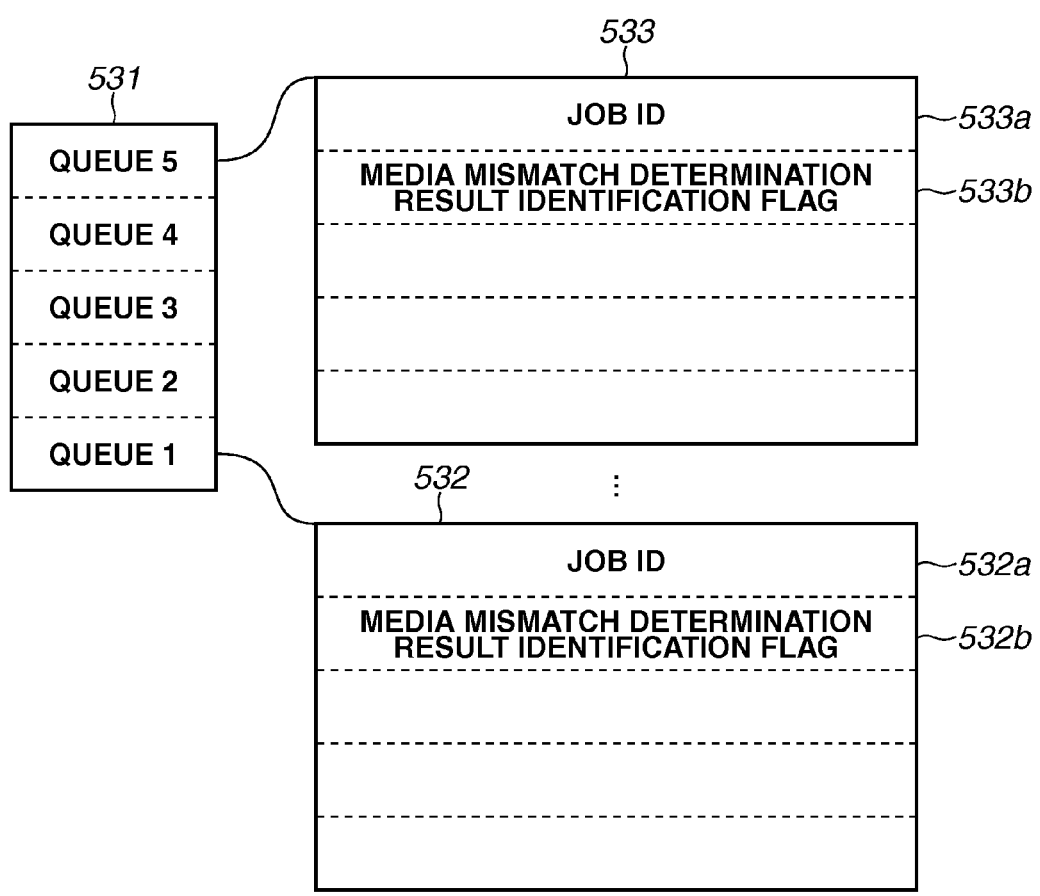

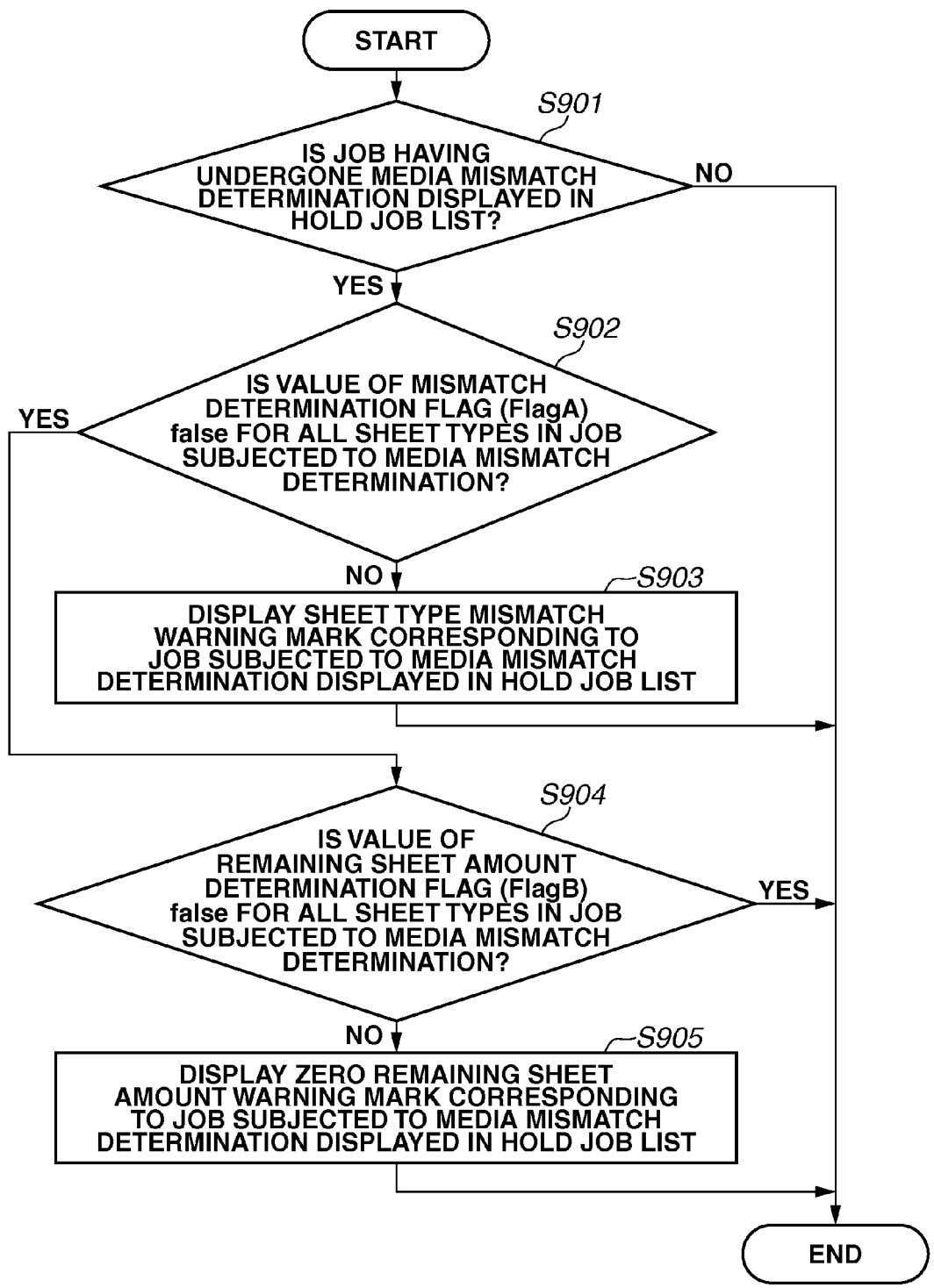

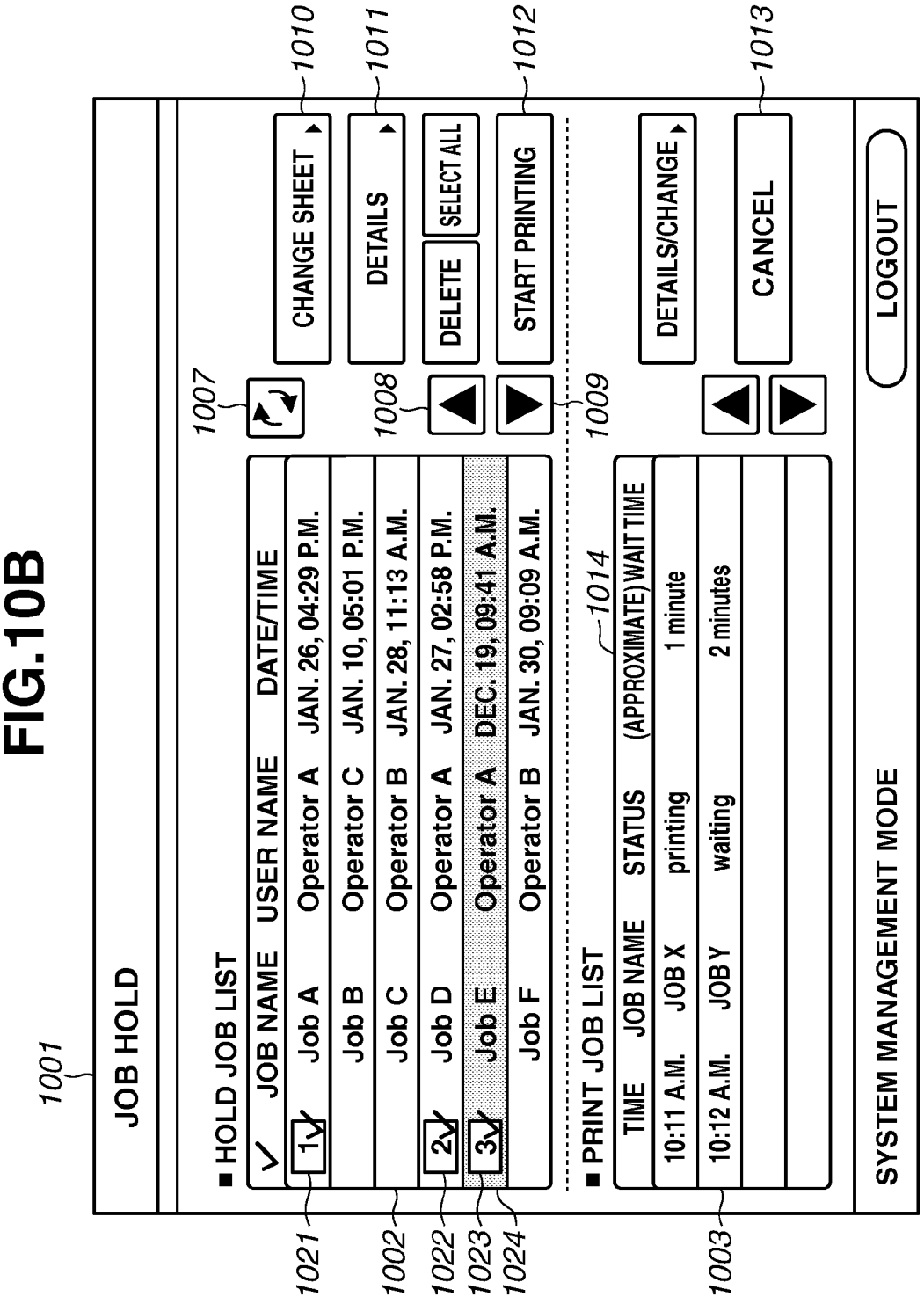

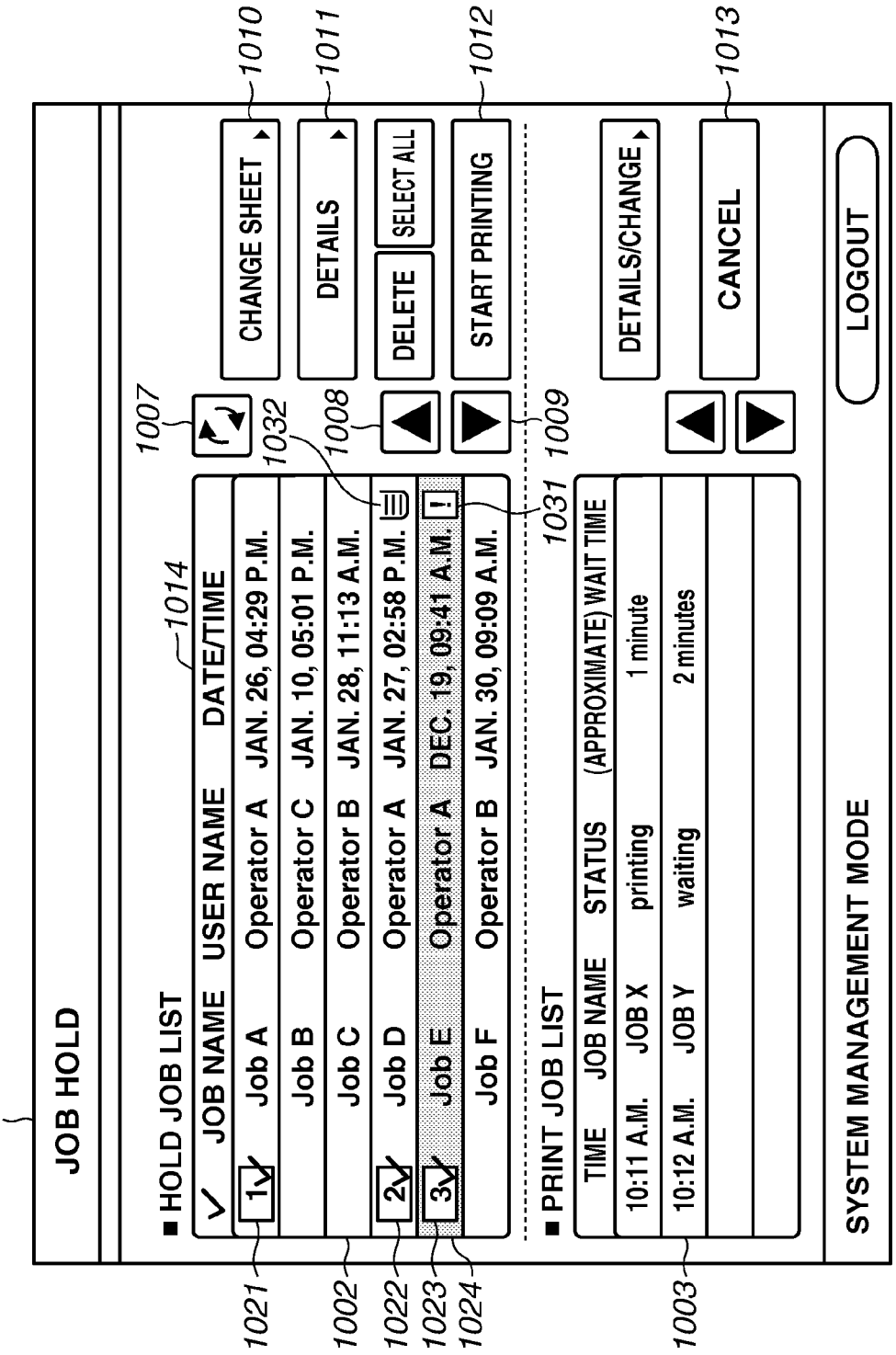

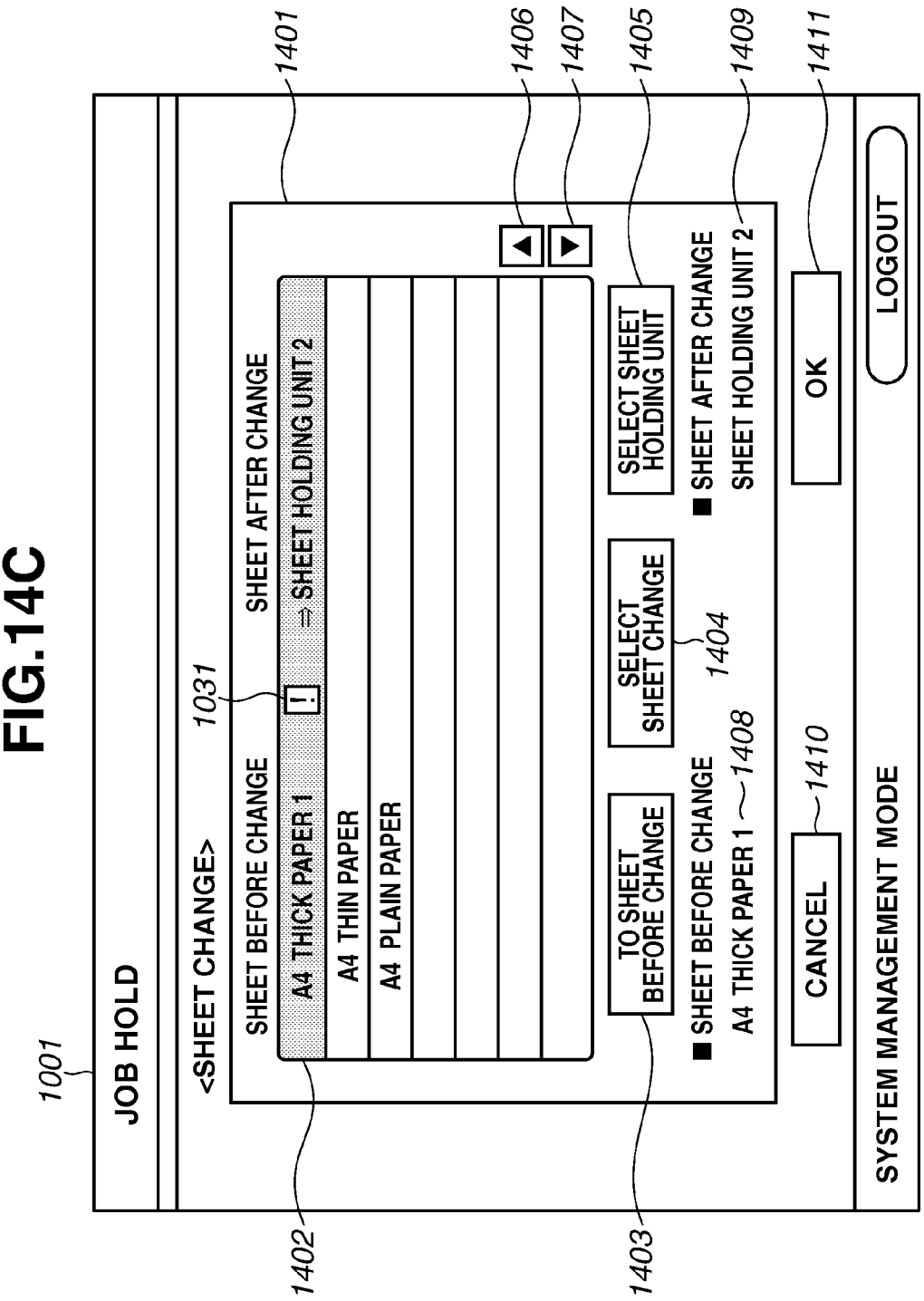

FIG.15

| SHEET HOLDING UNIT ID (1511) | SIZE (1512) | MEDIA TYPE (1513) | REMAINING SHEET AMOUNT (1514) |
|---|---|---|---|
| 1 | A4 | PLAIN PAPER 1 | 3 |
| 2 | A4 | COLORED PAPER (RED) | 1 |
| 3 | A3 | PLAIN PAPER 1 | 2 |
| 4 | B4 | PLAIN PAPER 1 | 0 |
| 5 | B5 | PLAIN PAPER 1 | 3 |
| 6 | A4 | INDEX PAPER | 3 |
| 7 | LTR | PLAIN PAPER 1 | 1 |
| 8 | A4 | TWO-SIDED COATED PAPER 1 | 1 |
| 9 | 11×17 | PLAIN PAPER 1 | 0 |
| 10 | A3 | THICK PAPER 2 | 0 |

FIG.16A

Job A

| SIZE | MEDIA TYPE |
|---|---|
| A4 | PLAIN PAPER 1 |
| A4 | TWO-SIDED COATED PAPER 1 |

1601 → (header row)
1604 → A4 / PLAIN PAPER 1
1605 → A4 / TWO-SIDED COATED PAPER 1

FIG.16B

Job D

| SIZE | MEDIA TYPE |
|---|---|
| LTR | PLAIN PAPER 1 |
| 11×16 | PLAIN PAPER 1 |

1602 → (header row)
1606 → LTR / PLAIN PAPER 1
1607 → 11×16 / PLAIN PAPER 1

FIG.16C

Job E

| SIZE | MEDIA TYPE |
|---|---|
| A4 | PLAIN PAPER 1 |
| A4 | COLORED PAPER (RED) |
| A3 | TWO-SIDED COATED PAPER 2 |

1603 → (header row)
1608 → A4 / PLAIN PAPER 1
1609 → A4 / COLORED PAPER (RED)
1610 → A3 / TWO-SIDED COATED PAPER 2

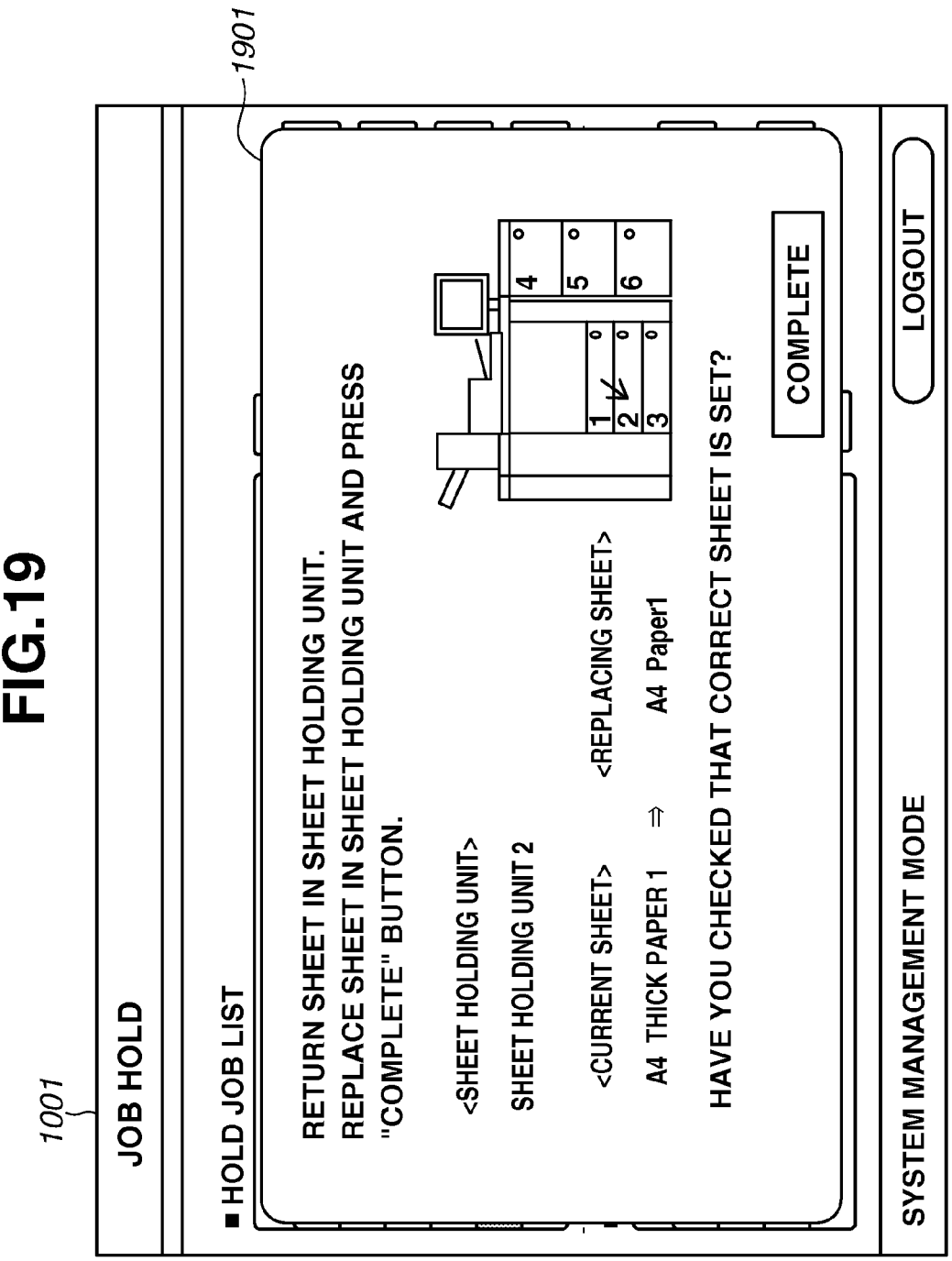

PRINTING APPARATUS AND COMPUTER
PROGRAM PRODUCT FOR MANAGING
SHEET ATTRIBUTE INFORMATION FOR
PRINT JOBS

BACKGROUND OF THE INVENTION

1. Field of the Invention

The present invention relates to a control apparatus capable of storing a job and executing the stored job, a printing apparatus, and a storage medium.

2. Description of the Related Art

Conventionally, in a printing apparatus provided with a plurality of sheet holding units, a known technique notifies a user that attribute information of a certain sheet to be used by a job (for example, the sheet size) is not registered in any sheet holding unit, by using an operation screen (refer to Japanese Patent Application Laid-Open No. 2010-284919). Another known technique notifies a user of either that the size of a certain sheet to be used by a job is not registered in any sheet holding unit or that there is no remaining amount of sheets of a certain sheet to be used by a job, by using a job status list screen (refer to Japanese Patent Application Laid-Open No. 2010-49167).

If the attribute information of a certain sheet to be used by a job is not stored in any sheet holding unit, execution of the job will be stopped. In order to continue execution of the job in such a case, the attribute information of a sheet stored in any one of sheet holding units is changed to the attribute information of the sheet to be used by the relevant job. Another method for continuing execution of the relevant job is to select a sheet holding unit as a sheet feeding source of the relevant sheet, and store the relevant sheet in the selected sheet holding unit, thus achieving a state where the sheet to be used by the relevant job is stored in any one of sheet holding units. However, with the above-described conventional methods, when the user selects a sheet holding unit as a sheet feeding source of the relevant sheet, and stores the sheet in the selected sheet holding unit, the user is unable to easily make sure that the sheet to be used by the relevant job is stored in any one of sheet holding units.

SUMMARY OF THE INVENTION

According to an aspect of the present invention, a control apparatus includes a storing unit configured to store attribute information of sheets to be stored in sheet holding units, a determining unit configured to determine whether attribute information of sheets to be used by a job corresponds to the sheet attribute information stored in the storing unit, a first notification unit configured to notify, in a case where the determining unit determines that the attribute information of sheets to be used by the job does not correspond to the sheet attribute information stored in the storing unit, a user that the attribute information of sheets to be used by the job does not correspond to the sheet attribute information stored in the storing unit, a selection unit configured to select the sheet attribute information stored in the storing unit to change the attribute information of sheets to be used by the job, and a second notification unit configured to notify, in accordance with selection of the sheet attribute information by the selection unit, the user that the attribute information of sheets to be used by the job corresponds to the sheet attribute information stored in the storing unit.

Further features of the present invention will become apparent from the following description of exemplary embodiments with reference to the attached drawings.

BRIEF DESCRIPTION OF THE DRAWINGS

FIG. 4 is a top view illustrating an operation unit of the digital printer according to the first exemplary embodiment.

FIG. 5C illustrates the contents of data stored in a hold queue buffer according to the first exemplary embodiment.

FIG. 9 is a flowchart illustrating the media mismatch determination result notification (in step S900) illustrated in FIG. 6 in the digital printer according to the first exemplary embodiment.

FIGS. 10A, 10B, and 10C illustrate an example of a job hold function operation screen displayed on the operation unit of the digital printer according to the first exemplary embodiment.

FIGS. 14A, 14B, and 14C illustrate an example of a sheet change screen displayed on the operation unit of the digital printer according to the first exemplary embodiment.

FIG. 15 illustrates an example of a sheet management table for managing information about sheets stored in respective sheet holding units of the digital printer according to the first exemplary embodiment.

FIGS. 16A, 16B, and 16C illustrate sheet information used by each of Job A, Job D, and Job E illustrated in FIG. 10A.

FIG. 19 illustrates an example of a warning screen displayed on the operation unit of a digital printer according to a third exemplary embodiment.

DESCRIPTION OF THE EMBODIMENTS

Figure 1:
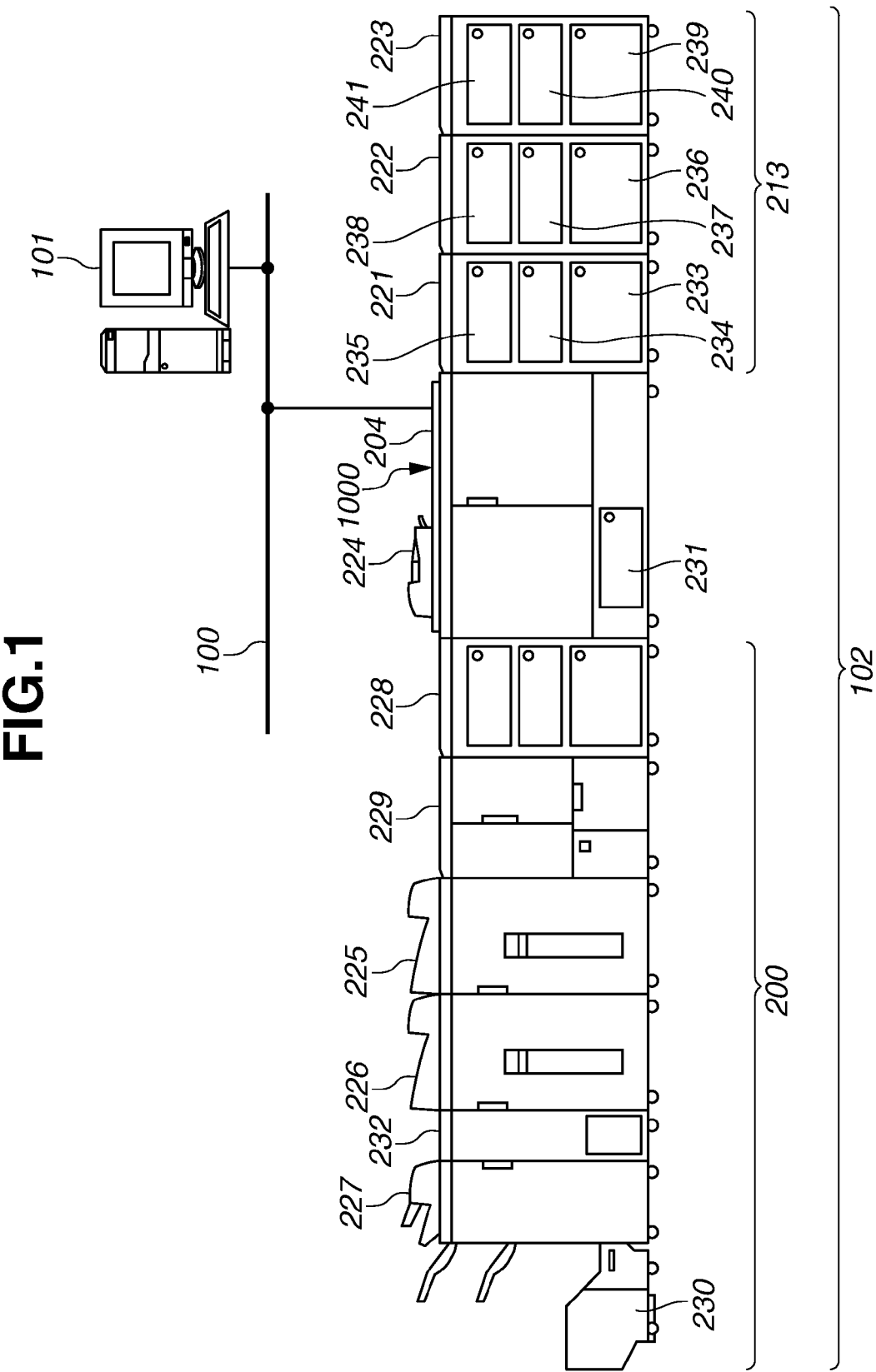
FIG. 1 illustrates a digital printing system according to a first exemplary embodiment of the present invention.

Various exemplary embodiments, features, and aspects of the invention will be described in detail below with reference to the drawings.

The following exemplary embodiments do not limit the present invention within the ambit of the appended claims. Not all of the combinations of the features described in the present exemplary embodiment are indispensable to the solutions for the present invention.

A digital printing system according to a first exemplary embodiment of the present invention will be described below with reference to FIG. 1. In this printing system, a digital printer (printing apparatus) 102 and a computer 101 are connected with each other via a network 100.

The digital printer 102 includes a plurality of interconnected apparatuses having different roles to achieve complicated sheet processing.

The digital printer 102 can be roughly divided into three portions with a printer unit 1000 in the middle. Referring to FIG. 1, apparatuses arranged on the right-hand side of the printer unit 1000 are referred to as sheet feeding apparatuses having a main role of successively feeding internally stored sheets to the printer unit 1000 at suitable timing. The apparatuses also detect the remaining amount of internally stored sheets via sensors (not illustrated). Sheet holding units 231 included in the printer unit 1000 are able to perform equivalent functions to those of the sheet feeding apparatuses. The sheet holding units 231 provided by the printer unit 1000 are also referred to as sheet feeding apparatuses in the following descriptions. Each unit constituting the digital printer 102 will be described below.

The printer unit 1000 forms (prints) an image by applying toner onto a recording medium (sheet) fed from a sheet holding unit 231, based on image data. The configuration and operating principle of the printer unit 1000 are as follows.

A beam of light, such as a laser beam, modulated according to image data is reflected by a rotating polygon mirror, and radiated onto a photosensitive drum as scanning light. An electrostatic latent image formed on the photosensitive drum by the laser beam is developed by toner. A toner image formed on a transfer drum is transferred onto a sheet pressed onto the transfer drum. A series of the above-described image forming process is performed sequentially on yellow (Y), magenta (M), cyan (C), and black (K) toner to form a full color image on the sheet. In addition to these four colors, toner of other special colors and transparent toner may be transferred. The sheet on the transfer drum, with the full color image formed thereon in this way, is conveyed to a fixing unit. The fixing unit includes a roller, a belt, and a heat source such as a halogen heater within the roller. The fixing unit dissolves toner of the toner image (transferred onto the sheet) with heat and pressure to fix it onto the sheet. Although the following describes the electrophotographic process, the printing process is not limited thereto. Any types of printers, such as an ink-jet printer and a thermal transfer printer, may be used.

The printer unit 1000 of the digital printer 102 according to the first exemplary embodiment includes a scanner (not illustrated) and an operation unit 204 (FIG. 4) arranged at the top face of the printer unit 1000. Since the operation unit 204 is arranged at the top face of the printer unit 1000, it is not illustrated in detail in FIG. 1. The operation unit 204 provides the user with various interfaces for performing various settings and operations on the printer unit 1000 according to the first exemplary embodiment. A sheet feeding apparatus 224 and the scanner are provided on the upper part of the printer unit 1000.

The digital printer 102 is configured such that various accompanying apparatuses as well as the printer unit 1000 can be attached.

Large-capacity sheet feeding apparatuses 221, 222, and 223 are detachably attached to the printer unit 1000 in a direct or indirect way, and include a plurality of sheet holding units 233 to 241. Each of the sheet holding units 233 to 241 includes a sensor for detecting the remaining amount of sheets stored therein. This configuration enables the printer unit 1000 to perform print processing on a large volume of sheets. Although, in the present exemplary embodiment, the three large-capacity sheet feeding apparatuses 221, 222, and 223 are connected, the configuration is not limited thereto. Only one large-capacity sheet feeding apparatus 221 may be connected. The plurality of sheet holding units may include a paper feed tray and a manual feed tray which may be provided together.

Large-capacity stackers 225 and 226 are apparatuses for stocking printed sheets. The printing system having the above-described large-capacity sheet feeding apparatuses requires such large-capacity stackers since the printing system generates a large volume of print products. The number of large-capacity stackers and the number of large-capacity sheet feeding apparatuses are not limited to the configuration illustrated in FIG. 1. Although, in this example, two large-capacity stackers 225 and 226 are connected, the configuration is not limited thereto. Only one large-capacity stacker 225 may be connected.

In the large-capacity stackers 225 and 226, a door for taking out sheets stacked on an internal stacking tray can be opened by an instruction from the user. The door can also be automatically opened by an instruction from the printer unit 1000. When door open processing is performed, processing for stacking printed sheets on the large-capacity stackers 225 and 226 is controlled to stop in advance.

Further, the large-capacity stackers 225 and 226 are provided with a shift discharge function of shifting the stacking position of any sheet while stacking printed sheets. This enables sorting a large volume of stacked sheets in units of a certain fixed bundle.

A folding machine 232 is used to perform various folding processing, such as fold in the middle, Z-fold, fold in three, and fold in four.

A saddle stitch bookbinding machine 227 includes various units for performing stapling processing and processing for generating a bookbound output product (saddle stitch, saddle fold, punching, shift discharge processing, etc.) on sheets printed by the printer unit 1000. When generating a saddle stitch bookbound output product by using the saddle stitch bookbinding machine 227, the digital printer 102 according to the first exemplary embodiment forms an output product by combining the saddle fold function and the saddle stitch function provided by the saddle stitch bookbinding machine 227 without using the folding function of the folding machine 232.

A cutting machine 230 conveys the bookbound output product saddle-stitched by the saddle stitch bookbinding machine 227, and cuts the portion corresponding to the front edge to form a front edge on the flat surface.

An inserter 228 inserts, at suitable timing based on settings, a sheet held by the inserter 228 into sheets sent from the printer unit 1000. The inserter 228 enables inserting a sheet which requires no printing between printed sheets. Similar to the large-capacity sheet feeding apparatuses 221, 222, and 223, the inserter 228 includes a plurality of large-capacity sheet feeding portions adaptable to large volume print processing.

A case bookbinding machine 229 performs front cover gluing processing on a sheet bundle printed by the printer unit 1000 or discharged from the inserter 228 to form a case-bookbound output product. Further, the case bookbinding machine 229 is capable of performing top gluing bookbinding equivalent to gluing bookbinding processing without attaching a cover.

The folding machine 232, the saddle stitch bookbinding machine 227, the cutting machine 230, the inserter 228, and the case bookbinding machine 229 may or may not be included in the digital printer 102.

Referring to FIG. 1, the apparatuses including the large-capacity stackers 225 and 226 for stacking sheets, arranged on the left-hand side of the printer unit 1000, are collectively referred to as sheet process apparatuses. The sheet process apparatuses are also referred to as sheet processing apparatuses or post-processing apparatuses. The sheet process apparatuses apply various processes to sheets that have undergone print processing, and stack the sheets. Hereinafter, the above-described sheet feeding apparatuses and the sheet process apparatuses are collectively referred to as sheet processing apparatuses 200.

Figure 2:
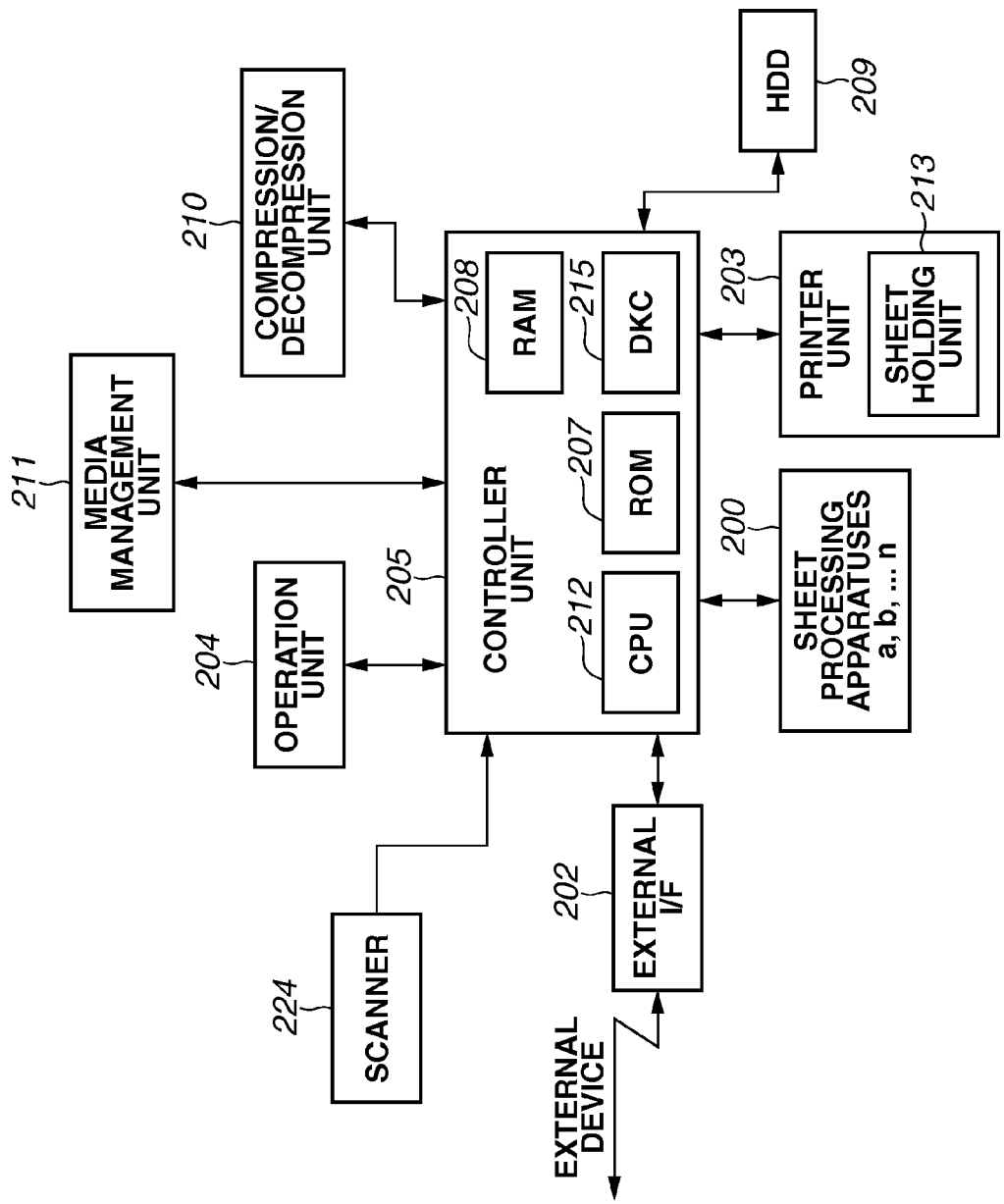
FIG. 2 is a functional block diagram illustrating a functional configuration of the digital printer according to the first exemplary embodiment.

A circuit configuration of the digital printer 102 according to the first exemplary embodiment will be described below with reference to the functional block diagram illustrated in FIG. 2. The sheet processing apparatuses 200 including the above-described various sheet feeding apparatuses and the sheet process apparatuses are configured as illustrated in FIG. 2.

The digital printer 102 includes a nonvolatile memory (storing unit), such as a hard disk (HDD) 209 which is capable of storing in the apparatus a plurality of jobs subjected to processing. Although, in the first exemplary embodiment, the digital printer 102 uses a hard disk as a nonvolatile memory, the configuration is not limited to the hard disk as long as the nonvolatile memory is a similar large-capacity nonvolatile storage device. The nonvolatile memory may be a solid state drive (SSD) instead of the HDD 209.

The digital printer 102 is capable of storing data received from the scanner in the HDD 209, reading the data from the HDD 209, and printing it in a printer unit 203. The digital printer 102 has a print function of storing in the HDD 209 a job received from an external apparatus via an external I/F 202 as an example communication unit, reading the job from the HDD 209, and printing it in the printer unit 203. The digital printer 102 is a multifunctional processing apparatus (MFP) (also referred to as an image forming apparatus) provided with such a plurality of functions. The digital printer 102 may perform color or monochrome printing.

The scanner reads a document image to acquire image data, performs image processing on the acquired image data, and outputs the resultant image data. The external I/F 202 transmits and receives image data to/from an external apparatus. The external apparatus is, for example, a facsimile apparatus, a network connection device, or an external dedicated apparatus. The HDD 209 also stores various management information which is permanently stored, changed, and managed by the digital printer 102. The digital printer 102 includes a printer unit 203 for performing print processing on a printing target job stored in the HDD 209. The printer unit 203 includes a sheet feeding unit 213 for feeding sheets stored in the sheet holding units 233 to 241. A controller unit (control unit) to be described below performs sheet feeding control on the sheet feeding unit 213 based on determined sheet feeding sources of sheets to be used by the printing target job.

The digital printer 102 also includes the operation unit 204 having a display, as an example user interface unit. A controller unit (control unit) 205 included in the digital printer 102 includes a central processing unit (CPU) 212 to control processing and operations of various units included in the digital printer 102. The controller unit (control unit) 205 includes a read only memory (ROM) 207 and a random access memory (RAM) 208. The ROM 207 and the RAM 208 store various control programs to be executed by the CPU 212 to implement various processing of flowcharts (described below). The ROM 207 also stores a display control program for displaying on the display unit of the operation unit 204 various user interface (UI) screens (hereinafter referred to as UI screens).

The CPU 212 of the controller unit 205 reads a program stored in the ROM 207 and executes it to cause the digital printer 102 to perform various operations according to the first exemplary embodiment. The ROM 207 also stores a program for causing the CPU 212 to execute processing for interpreting page description language (PDL) data received from an external apparatus via the external I/F 202, and rasterizing the PDL data into raster image data (bit map image data). Likewise, the ROM 207 also stores a program for causing the CPU 212 to interpret and process a print job received from an external apparatus via the external I/F 202. These pieces of processing are executed by software. The ROM 207 is a read only memory for prestoring programs related to the boot sequence and font information. Various programs stored in the ROM 207 will be described in detail below. The RAM 208 is a readable and writable memory for storing various programs, setting information, and image data sent from the scanner and the external I/F 202.

The HDD 209 prestores various programs (described below) and image data compressed by a compression/decompression unit 210. The HDD 209 is configured to store a plurality of data items, such as print data of a processing target job. The controller unit 205 stores in the HDD 209 a processing target job input via various input units, such as the scanner and the external I/F 202, reads the job from the HDD 209, and outputs it to the printer unit 203 for printing. The controller unit 205 also performs control to transmit a job read from the HDD 209 to an external apparatus via the external I/F 202. Thus, the controller unit 205 performs various output processing for a processing target job stored in the HDD 209. Although, in the above-described example, the HDD 209 is used, a volatile RAM may be used. The compression/decompression unit 210 compresses and decompresses image data stored in the RAM 208 and the HDD 209 based on various compression techniques, such as JBIG and JPEG.

A disk controller (DKC) 215 of the controller unit 205 controls access to the HDD 209.

The controller unit 205 also controls operations of the sheet processing apparatuses 200. The sheet processing apparatuses 200 correspond to the sheet feed system and the sheet process apparatuses described with reference to FIG. 1. A media management unit 211 is a module for managing information about sheets processable by the digital printer 102. The information about sheets processable by the digital printer 102 is stored in the HDD 209.

The computer 101 is a general purpose computer connected with the digital printer 102 via the network 100. The computer 101 is capable of executing various application programs and transmitting a print job to the digital printer 102.

Figure 3:
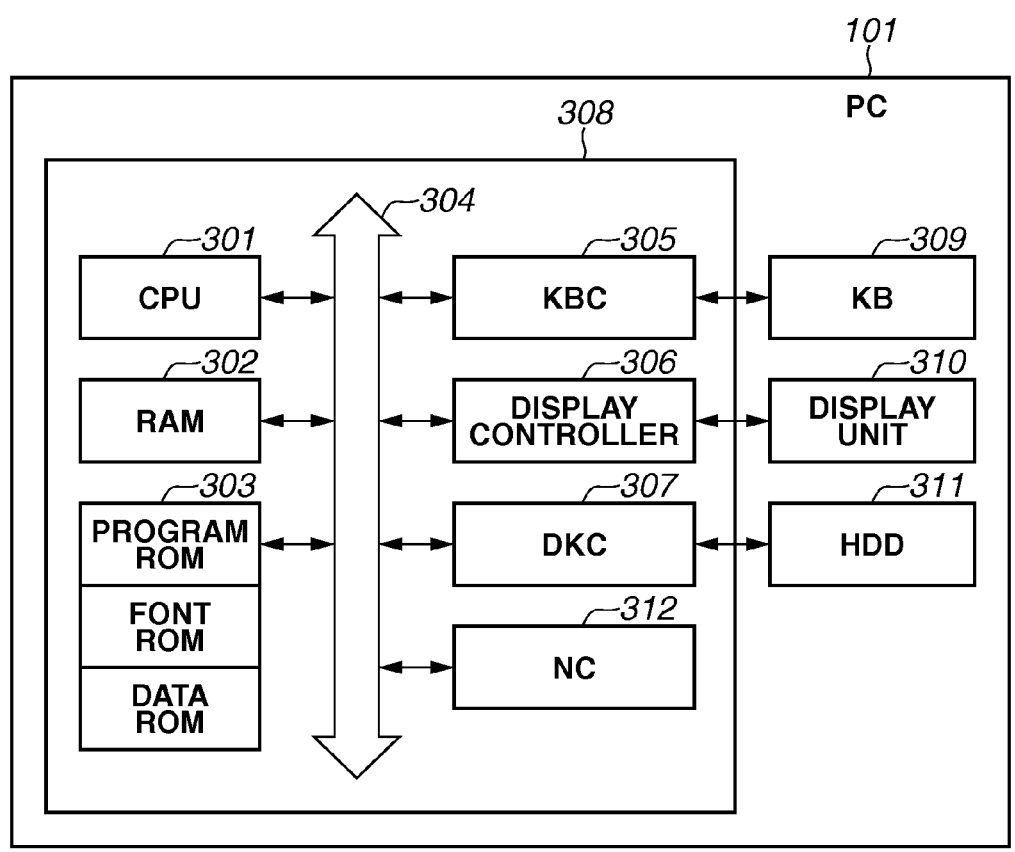
FIG. 3 is a block diagram illustrating a hardware configuration of a personal computer (PC) according to the first exemplary embodiment.

The configuration of the personal computer (PC) 101 illustrated in FIG. 1 according to the first exemplary embodiment will be described below with reference to the hardware block diagram illustrated in FIG. 3. Referring to FIG. 3, the CPU 301 executes programs, such as an operating system (OS) stored in a program ROM included in a ROM 303, and a general application and a bookbinding application loaded from the HDD 311 into a RAM 302. The ROM 303 also includes a font ROM and a data ROM. The RAM 302 functions as a main memory of the CPU 301 and a work area. A keyboard controller (KBC) 305 controls inputs from a keyboard 309 and a pointing device (not illustrated). A display controller 306 controls display on a display unit 310. A disk controller (DKC) 307 controls access to the HDD 311 storing the boot program, various applications, font data, and user files. A network controller (NC) 312 is connected to the network 100, and performs processing for controlling communication with other apparatuses connected to the network 100. A bus 304 connects the CPU 301 with the RAM 302, the ROM 303, and various controllers, and transmits data signals and control signals.

The operation unit 204 of the digital printer 102 according to the first exemplary embodiment will be described below with reference to the top view illustrated in FIG. 4. In the operation unit 204, a key input unit 402 can receive a user operation using hard keys. A touch panel unit 401 is a display unit capable of receiving a user operation using software keys (display keys) and displays various operation screens. The operation unit 204 is controlled by the controller unit 205. A screen displayed on the display of the touch panel unit 401 illustrated in FIG. 4 indicates an operation screen displayed under control of the controller unit 205. Items to be displayed or items operable on the display change according to a user operation performed on this screen or various states of the digital printer 102. For example, when the user operates the touch panel unit 401, a UI function program (described below) identifies the contents of the user operation performed on the touch panel unit 401, and executes processing according to the contents of the identification.

Although, in the above example, the operation unit 204 includes the key input unit 402 and the touch panel unit 401, the configuration is not limited thereto. The operation unit 204 may include only the touch panel unit 401.

Programs to be executed by the digital printer 102 will be described below.

These programs are stored in the HDD 209, and are read and executed by the CPU 212 of the controller unit 205 of the digital printer 102.

A job definition format (JDF) function program is executed by the controller unit 205 to implement the print function when the digital printer 102 receives a JDF job via the external I/F 202.

A page description language (PDL) function program is executed by the controller unit 205 to implement the print function when the digital printer 102 receives PDL data via the external I/F 202.

The user interface (UI) function program controls the operation unit 204. The UI function program identifies the contents of a user operation performed on the operation unit 204 of the digital printer 102, performs suitable screen transition, and requests (instructs) the controller unit 205 to perform print processing.

A sheet management program performs a management function related to sheets usable by the digital printer 102. Sheet-related information managed by the sheet management program is stored in the HDD 209. In the present exemplary embodiment, the sheet-related information managed by the sheet management program includes information about the sheet size, the media type, and the remaining sheet amount of sheets to be stored in each sheet holding unit. The sheet type is determined by the combination of the sheet size and the media type. In addition to the above-described information, the sheet management information may include, for example, information about the sheet name and the sheet grammage.

A job hold function program is executed by the controller unit 205 when the user of the digital printer 102 instructs to execute the job hold function from the operation unit 204. The job hold function stores printing target data in the HDD 209 of the digital printer 102 until a print instruction is received from the user. Then, when the user selects printing target data, the data is printed upon reception of a print instruction. With the job hold function, the controller unit 205 sequentially issues instructions for operations of these devices in a suitable order based on the processing order and processing conditions described in the job hold function program, thus performing print processing based on the job hold function. These devices include the printer unit 203, the sheet processing apparatuses 200, the HDD 209, the compression/decompression unit 210, and the RAM 208. The settings of stored jobs can be changed from those set at the time of storing the jobs.

When the user stores a print job by using the job hold function of the digital printer 102 from the computer 101 functioning as an external apparatus, the user performs the following procedures. Specifically, the user instructs to store the print job by using the job hold function, instead of executing the PDL function program or the JDF function program to perform print processing on the job. Whether the print processing is performed on the job by the PDL function program or the JDF function program, or the job is stored by the job hold function is designated by a print application operating on the computer 101 to which the user loads the job. This designation is reflected to the setting attribute of the job subjected to processing by the PDL function program or the JDF function program. Then, the PDL function program or the JDF function program switches the processing based on the setting attribute.

A media mismatch determination function program is executed by the controller unit 205 to perform the following determination when the user of the digital printer 102 instructs to execute the media mismatch determination function from the operation unit 204. In the media mismatch determination according to the present exemplary embodiment, the controller unit 205 determines whether the attribute information of a sheet to be used by a print job, in which sheet feeding source information is a sheet type designation, is registered in any one of the sheet holding units, and whether there is a certain remaining sheet amount of the sheet to be used by the print job. A print job having a sheet designation as sheet feeding source information will be described in detail below.

The controller unit 205 reads the attribute information of sheets usable by the digital printer 102 stored in the HDD 209 of the digital printer 102 by using the sheet management program. Then, the controller unit 205 compares the relevant attribute information with the attribute information of the sheet to be used in the job held by the job hold function program to determine whether the attribute information of the sheet to be used by the print job is registered in any one of the sheet holding units. Further, the controller unit 205 detects the remaining amount of sheets via a sensor provided in the sheet holding unit, and determines whether there is a certain remaining sheet amount of the sheet to be used by the print job. The result of the media mismatch determination performed by the media mismatch determination function program is held in a flag, and is stored in the RAM 208.

The attribute information of a sheet to be used by the print job includes at least one of sheet size, sheet grammage, sheet surface property, sheet shape, and sheet color.

Although some of function programs have been described in detail above, not all of function programs needs to be prepared, and some of function programs or function programs other than the above-described ones may be provided.

Figure 5A:
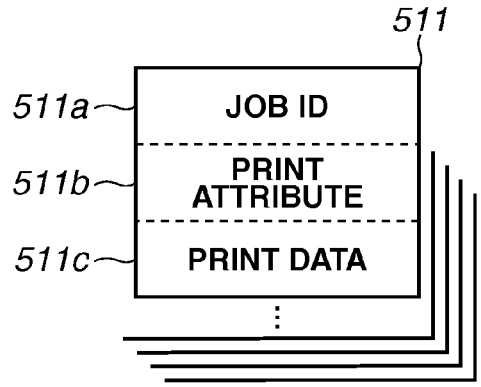
FIG. 5A illustrates the contents of entry data according to the first exemplary embodiment.

Data structures of a job, print queue data, and hold queue data of the digital printer 102 according to the first exemplary embodiment will be described below with reference to FIGS. 5A, 5B, and 5C.

The data structure of a job will be described below with reference to FIG. 5A. Each job input into the digital printer 102 has a structure of an entry 511 as illustrated in FIG. 5A. The entries 511 exist for the number of jobs input into and processed by the digital printer 102. The entry 511 includes a job identifier (ID) 511*a*, a print attribute 511*b*, and print data 511*c*. The job ID 511*a* in the entry 511 is a unique ID, and is used by the digital printer 102 to identify a job. The print attribute 511*b* in the entry 511 stores print attribute defined by the job. The print attribute 511*b* describes, for example, the name of a user who input the job, the size of sheet to be fed, the medium type, and the number of pages. The print data 511*c* in the entry 511 stores print data which describes an image to be drawn on a print sheet.

The data structure of the print queue data will be described below with reference to FIG. 5B. When a job is input in the print queue, the job is managed by a print queue buffer 521. When a job is input into the print queue in a state where there is no job therein, the job is registered in a queue 1 of the print queue buffer 521. When another job is input, the job is registered (or stacked) in a queue 2 of the print queue buffer 521. Basically, the registered jobs are sequentially processed for printing from the one stacked in the queue 1. Upon completion of printing of the job in the queue 1, the job is deleted from the print queue buffer 521, and the job in the queue 2 of the print queue buffer 521 is shifted to the queue 1. Then, the job stacked in the queue 1 is processed for printing. Although FIG. 5B illustrates only five queues, a suitable number of queues is provided in consideration of the memory capacity and the print processing speed of the digital printer 102.

The attribute of a job registered in each print queue is managed by a print queue job attribute table. Referring to FIG. 5B, a print queue job attribute table 522 corresponding to a job is registered in the queue 1, and a print queue job attribute table 523 corresponding to a job is registered in the queue 5. Actually, such tables exist for the number of queues of the print queue buffer 521. The print queue job attribute table 522 will be described in detail below.

The print queue job attribute table 522 includes a job ID 522*a* for identifying a job, a flag 522*b* for identifying the result of the media mismatch determination, and a flag 522*c* for distinguishing whether the job is to be suspended.

The media mismatch determination will be described in detail below with reference to FIG. 7. The print queue job attribute table 522 does not include the entity of the relevant job. Although, in the present exemplary embodiment, the print queue job attribute table 522 does not include the entity of the relevant job, it may include the entity of the job, for example, as a result of copying. The the CPU 212 searches, in the plurality of entries 511, for the job ID 511*a* having the same value as the job ID 522*a*. Then, the CPU 212 acquires the print attribute 511*b* and the print data 511*c* of an entry 511 identified from the job ID 511*a* having the same value as the job ID 522*a*.

The data structure of the hold queue data will be described below with reference to FIG. 5C. When a printing execution instruction for the print data managed by a hold queue buffer 531 is issued, the relevant print data is moved to the print queue buffer 521. When a job is input into a hold queue, the job is entered in the hold queue buffer 531. The hold queue buffer 531 is an area for storing storage jobs to be managed by the job hold function program. A storage target job received from an external apparatus is stored in the hold queue buffer 531 together with print settings. Since the structure of the hold queue buffer 531 is similar to that of the print queue buffer 521, detailed descriptions thereof will be omitted.

The attribute of a job registered in each hold queue is managed by a hold queue job attribute table. Referring to FIG. 5C, a hold queue job attribute table 532 corresponding to a job is registered in the queue 1, and a hold queue job attribute table 533 corresponding to a job is registered in the queue 5. Actually, such tables exist for the number of queues of the hold queue buffer 531. The hold queue job attribute table 532 will be described in detail below.

The hold queue job attribute table 532 includes a job ID 532*a* for identifying a job and a flag 532*b* for identifying the result of the media mismatch determination. The hold queue job attribute table 532 does not include the entity of the job. Although, in the present exemplary embodiment, the hold queue job attribute table 532 does not include the entity of the relevant job, it may include the entity of the job, for example, as a result of copying. The CPU 212 searches, in the plurality of entries 511, for the job ID 511*a* having the same value as the job ID 532*a*. Then, the CPU 212 acquires the print attribute 511*b* and the print data 511*c* of an entry 511 identified from the job ID 511*a* having the same value as the job ID 532*a*.

Processing performed after a job is input until it is stacked in the print queue buffer 521 or the hold queue buffer 531 will be described below. This processing is implemented when the CPU 212 of the controller unit 205 executes the job hold function program loaded from the ROM 207 or the HDD 209 into the RAM 208.

First, the user inputs a job to perform print processing by using the digital printer 102. A queue designation value indicating whether the job designates storage in the print queue buffer 521 or storage in the hold queue buffer 531 is recorded as an attribute of the job. After receiving a job input by the user, a unique ID is generated and assigned to the job. Then, one entry 511 is generated for each job. The generated job ID is input into the job ID 511*a* in the entry 511, the print attribute of the received job is input into the print attribute 511*b* in the entry 511, and the received print data is input into the print data 511*c* in the entry 511.

Then, the CPU 212 reads the above-described queue designation value. When the queue designation value indicates the print queue, the job is stacked in a queue of the print queue buffer 521. On the other hand, when the queue designation value indicates the hold queue, the job is stacked in a queue of the hold queue buffer 531.

Figure 5B:
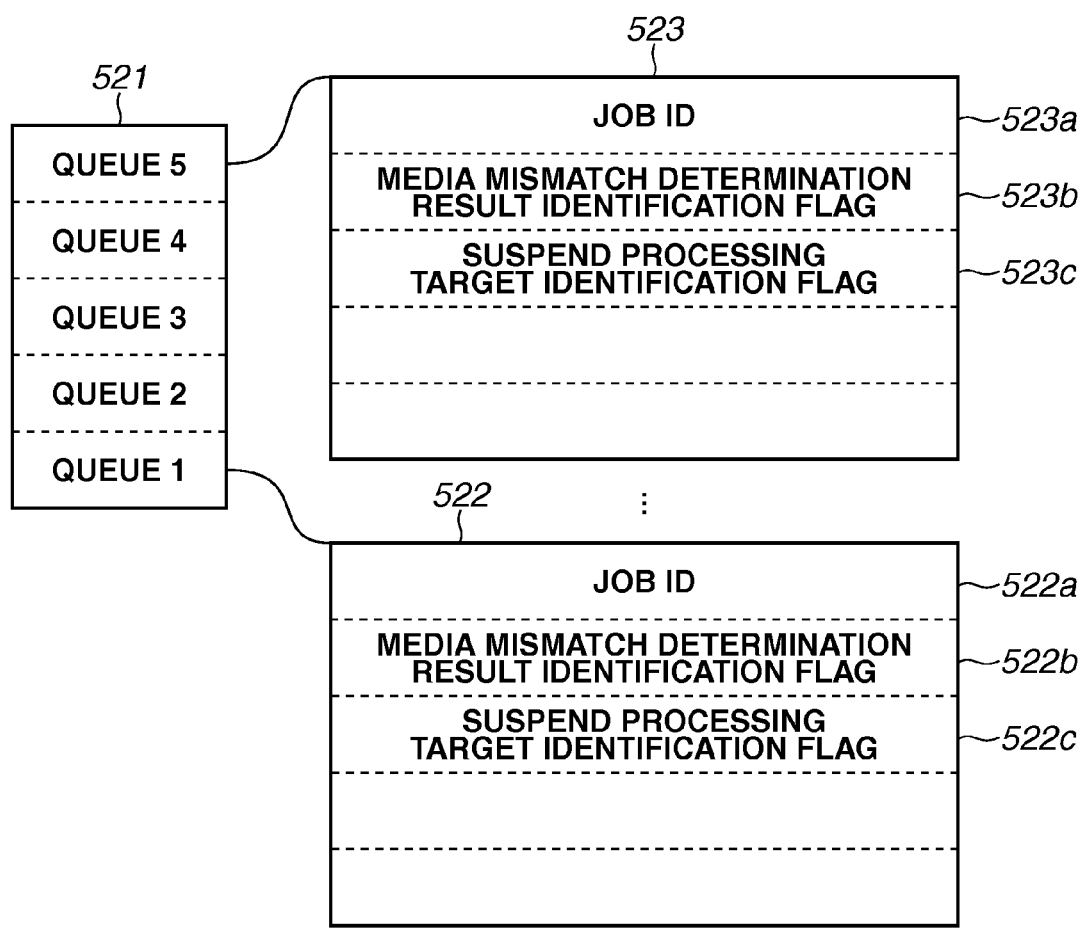
FIG. 5B illustrates the contents of data stored in a print queue buffer according to the first exemplary embodiment.

When stacking a job in a queue of the print queue buffer 521, the CPU 212 generates one print queue job attribute table 522 illustrated in FIG. 5B for each job. Then, the job ID is registered in the job ID 522a of the print queue job attribute table 522.

On the other hand, when stacking a job in a queue of the hold queue buffer 531, the CPU 212 generates one hold queue job attribute table 532 illustrated in FIG. 5C for each job. Then, the job ID is registered in the job ID 532a of the hold queue job attribute table 532.

Jobs stacked in the hold queue buffer 531, i.e., jobs held by the job hold function program includes a job having a sheet type designation as the sheet feeding source information and a job having a sheet holding unit designation as the sheet feeding source information.

A job designating a sheet type designates a sheet to be used by the print job, feeds sheets from sheet holding units in which the sheet type designated by the print job is registered, and performs print processing. Therefore, such a job in which a sheet type is designated compares the attribute information of the sheet to be used by the job designating a sheet type, with the attribute information of the sheet registered in the sheet holding unit, which enables making of a media mismatch determination (described below) in step S700 of FIG. 6. On the other hand, when the same sheet is stored in each sheet holding unit as a regular operation, a job designating a sheet holding unit designates a sheet holding unit which stores a desired sheet in advance instead of designating a sheet to be used by the print job and feeds a sheet from the designated sheet holding unit to perform printing. Therefore, when the media mismatch determination is performed on a job designating a sheet holding unit, it is presumed that the attribute information of a sheet to be used by such a print job is registered in any one of the sheet holding units.

Therefore, in the first exemplary embodiment, it is assumed that a print job subjected to the media mismatch determination is a job designating a sheet type. When it is determined that the attribute information of a sheet to be used by the print job is not registered in any sheet holding unit as a result of the media mismatch determination, control is performed such that the mismatch sheet is fed from a sheet holding unit selected by the user as described below.

Figure 10A:
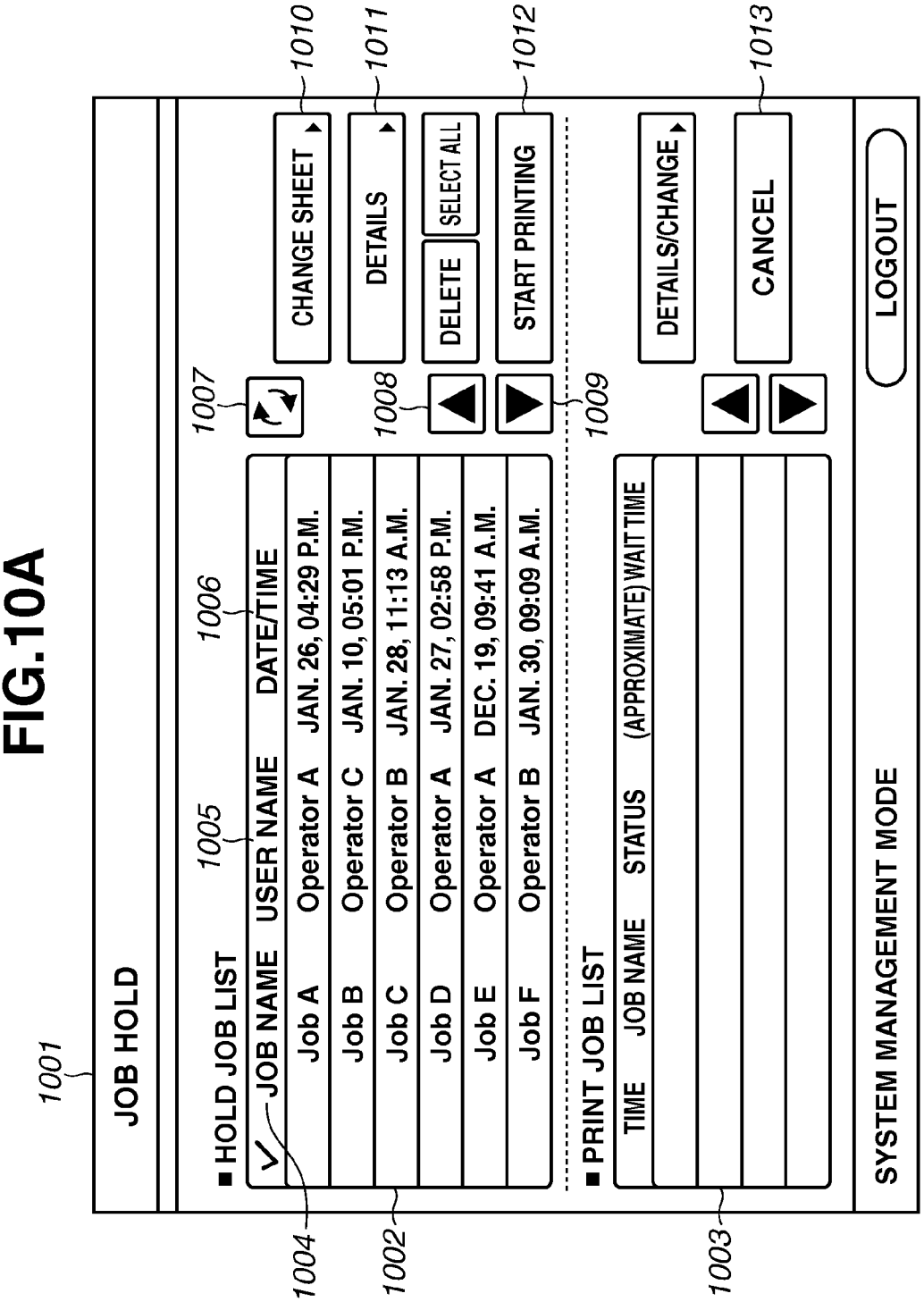

The media mismatch determination is started in a state where the screen illustrated in FIG. 10A is displayed on the display of the operation unit 204.

An example of the job hold function operation screen displayed on the operation unit 204 of the digital printer 102 according to the first exemplary embodiment will be described below with reference to FIG. 10A. This screen includes a plurality of display areas and a plurality of operation buttons. Important points in the descriptions of the first exemplary embodiment will be described below. The job hold function is a function of storing printing target data in the HDD 209 of the digital printer 102 until a print instruction is received from the user, and then performing printing according to the data as to which the print instruction has been received from the user. The job hold function enables the digital printer 102 to store data for a plurality of print jobs in the HDD 209. The job hold function enables the user to designate the order of execution of print jobs selected from the plurality of print jobs stored in the HDD 209, and therefore can perform printing regardless of the order of storing in the HDD 209.

A hold job list 1002 is an area for displaying a list of print jobs stored in the above-described hold queue buffer 531 in the digital printer 102. Referring to the example illustrated in FIG. 10A, six print jobs are displayed. The digital printer 102 can store in the HDD 209 a larger number of print jobs than the number of print jobs displayable in the hold job list 1002 at the same time. For example, when seven or more print jobs are stored in the HDD 209, the user, by touching or pressing scroll buttons 1008 and 1009, can sequentially display in the hold job list 1002 all of print jobs stored in the HDD 209. The hold job list 1002 displays, for each of the print jobs, a job name 1004, a user name 1005, and a date/time field 1006 indicating the date and time on which the relevant print job was stored in the digital printer 102.

Based on the user name (operator name) 1005, a user who operates this job hold screen identifies his or her own job, and selects the relevant job as a printing target job.

In this case, when the user presses or touches with the finger the portion of a print job displayed in the hold job list 1002 (object selection), the print job is selected as a printing target job.

FIG. 10B illustrates a display example immediately after an operator A has selected print jobs by operating the job hold function operation screen displayed on the operation unit 204. In this case, the operator A has selected three print jobs, Job A, Job D, and Job E, in this order. These jobs in the selected state are indicated by selection marks 1021, 1022, and 1023 to the left of the job name field. The selection mark 1024 indicates last selected Job E, and Job E is highlighted. This indicates that Job E is currently in the selected state in the hold job list 1002.

A print job list 1003 displays print jobs with which the print processing has been started by the digital printer 102, or print jobs waiting for the start of the print processing. The print job list 1003 is an area for displaying a list of print jobs stored in the above-described print queue buffer 521. A waiting time 1014 indicates an approximate waiting time until print processing on each print job stored in the print queue buffer 521 is started.

Referring to the example illustrated in FIG. 10B, Job X is a print job with which print processing has been started (printing state). On the other hand, Job Y is a print job waiting for print processing (waiting state).

A DETAILS button 1011 is used to shift to a screen for checking details of the print jobs in the selected state in the hold job list 1002. Referring to the example illustrated in FIG. 14B, the user, by pressing the DETAILS button 1011 in a state where Job E is last selected, can check detailed information of Job E.

The START PRINTING button 1012 is used to register a print job selected in the hold job list 1002 in the print queue buffer 521, and instruct to start the print processing. When the START PRINTING button 1012 is pressed in a state where a print job is selected out of the print jobs displayed in the hold job list 1002, the selected print job is displayed in the print job list 1003 and shifts to the the print processing wait state. A CANCEL button 1013 is used to stop execution of the print job which has started print processing according to a print start instruction given by pressing the START PRINTING button 1012.

A media mismatch determination button 1007 is used to perform the media mismatch determination on the print jobs selected in the hold job list 1002. If there is no print job selected in the hold job list 1002, the media mismatch determination button 1007 may be grayed out (disabled). Referring to the example illustrated in FIG. 10B, the media mismatch determination will be performed for Job A, Job D, and Job E in the selected state.

Figure 6:
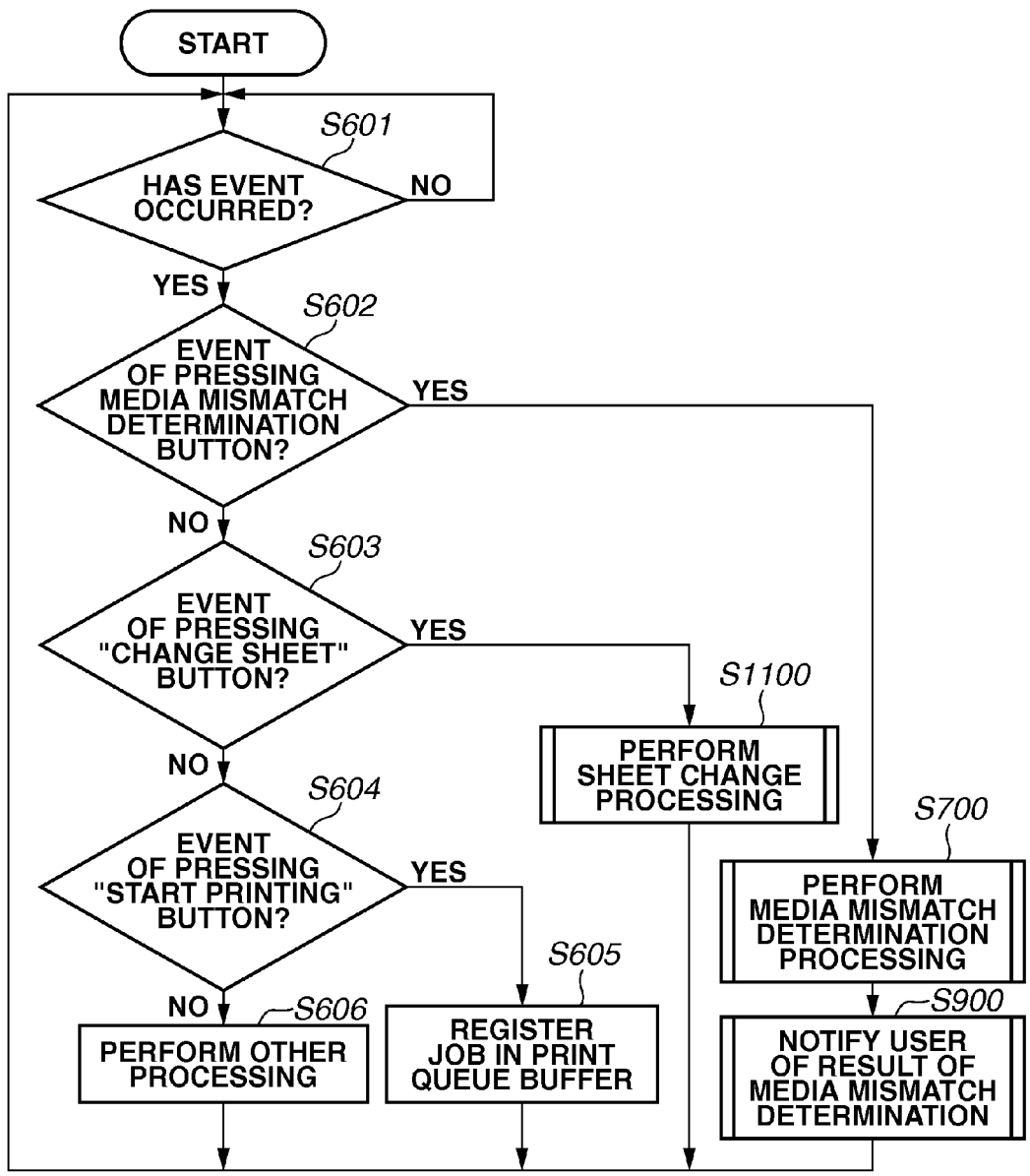
FIG. 6 is a flowchart illustrating a series of processing for the media mismatch determination in the digital printer according to the first exemplary embodiment.

A series of processing for the media mismatch determination according to the first exemplary embodiment performed on the jobs stacked in the hold queue buffer 531 will be described in detail below with reference to the flowchart illustrated in FIG. 6. This processing is implemented when the CPU 212 of the controller unit 205 executes the UI function program loaded from the ROM 207 or the HDD 209 into the RAM 208. The processing of the flowchart illustrated in FIG. 6 is started in a state where jobs are stacked in the hold queue buffer 531, the hold job list 1002 is displayed on the operation unit 204, and jobs have already been selected as illustrated in FIG. 10B.

In step S601, the CPU 212 waits for a user operation on the screen illustrated in FIG. 10A displayed on the operation unit 204. In this case, the CPU 212 repeats step S601 until the user performs a certain operation. When the user performs a certain operation on the operation unit 204 (YES in step S601), the CPU 212 proceeds to step S602.

In step S602, the CPU 212 determines whether the media mismatch determination button 1007 illustrated in FIG. 10A is pressed by the user operation. When it is determined that the media mismatch determination button 1007 is pressed (YES in step S602), the CPU 212 proceeds to step S700. The media mismatch determination button 1007 may be grayed out (disabled) in a state where no print job is selected. Further, if the media mismatch determination is to be performed only on selected print jobs, the CPU 212 may not proceed to step S700 even if the media mismatch determination button 1007 is pressed in a state where no print job is selected. Meanwhile, the media mismatch determination may be performed on all jobs stacked in the hold queue buffer 531 when the media mismatch determination button 1007 is pressed.

In step S700, the CPU 212 performs the media mismatch determination. The media mismatch determination in step S700 will be described in detail below with reference to FIG. 7.

After completion of the media mismatch determination in step S700, then in step S900, the CPU 212 performs processing for notifying the user of the result of the media mismatch determination (hereinafter simply referred to as media mismatch determination result notification), and returns to step S601. The media mismatch determination result notification in step S900 will be described in detail below with reference to FIG. 9.

On the other hand, when it is determined that the media mismatch determination button 1007 is not pressed (NO in step S602), then in step S603, the CPU 212 determines whether a CHANGE SHEET button 1010 illustrated in FIG. 10A is pressed by the user operation. The CHANGE SHEET button 1010 may be grayed out (disabled) in a state where no print job is selected. For a job with which media mismatch (sheet type mismatch) has not occurred, the CHANGE SHEET button 1010 may be grayed out (disabled) even when the job is in the selected state. Specifically, even in a job with a zero remaining sheet amount, the CHANGE SHEET button 1010 may be grayed out (disabled) if sheet type mismatch has not occurred.

When it is determined that the CHANGE SHEET button 1010 is pressed (YES in step S603), the CPU 212 proceeds to step S1100. When a print job is not in the selected state, the CPU 212 may not proceed to step S1100 even when the CHANGE SHEET button 1010 is pressed.

In step S1100, the CPU 212 performs processing for changing a sheet to be used by the selected job. The sheet change processing in step S1100 will be described in detail below with reference to FIG. 11. After completion of the sheet change processing in step S1100, the CPU 212 returns to step S601. After completion of the sheet change processing in step S1100, the CPU 212 may proceed to step S700, instead of returning to step S601, and perform the media mismatch determination by replacing the sheet to be used by the job with the changed sheet designated in step S1100. Specifically, after completion of the sheet change processing in step S1100, the CPU 212 can perform the media mismatch determination in step S700, and notify the user of the result of the media mismatch determination in step S900.

On the other hand, when the CHANGE SHEET button 1010 is determined to be not pressed (NO in step S603), then in step S604, the CPU 212 determines whether the START PRINTING button 1012 illustrated in FIG. 10A is pressed by the user operation.

When the CPU 212 determines that the START PRINTING button 1012 is pressed (YES in step S604), the CPU 212 proceeds to step S605. In a state where no job is selected, the START PRINTING button 1012 is grayed out and cannot be pressed.

In step S605, the CPU 212 registers in the print queue buffer 521 the job selected from the hold job list 1002 illustrated in FIG. 10B for the print processing. At this timing, the job registered in the print queue buffer 521 is displayed in the print job list 1003 illustrated in FIG. 10B, and the CPU 212 changes the job to the print processing wait state. After registering the job in the print queue buffer 521 in step S605, the CPU 212 returns to step S601.

On the other hand, when the CPU 212 determines that the START PRINTING button 1012 is not pressed (NO in step S604), then in step S606, the CPU 212 performs other processing according to the user operation. The processing in step S606 is, for example, selecting a job that has once undergone the media mismatch determination, and pressing the DETAILS button 1011 illustrated in FIG. 10B to make a transition to a screen for calling details of the job in the selected state.

Figure 7:
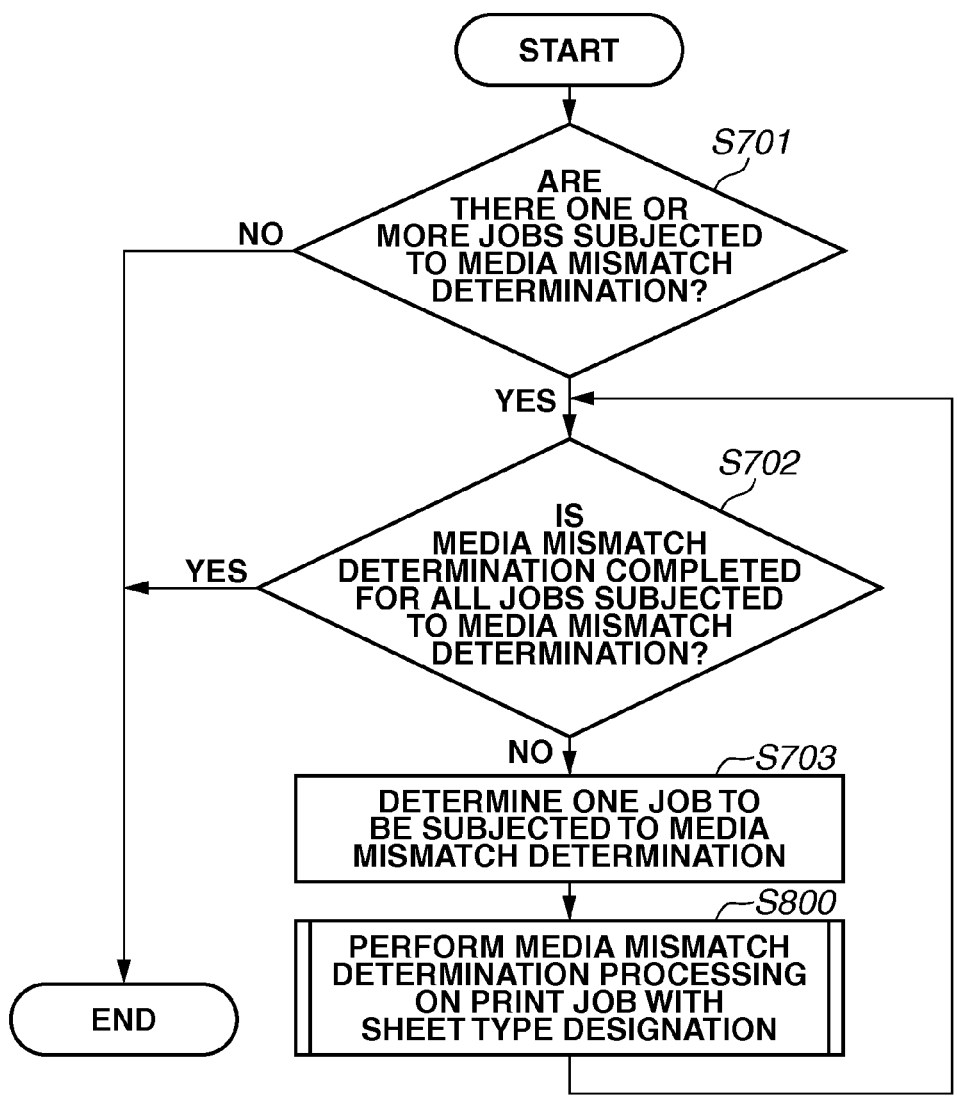
FIG. 7 is a flowchart illustrating the media mismatch determination (in step S700) illustrated in FIG. 6 in the digital printer according to the first exemplary embodiment.

FIG. 7 is a flowchart illustrating in detail the processing in step S700 of FIG. 6, i.e., the media mismatch determination according to the first exemplary embodiment. This processing is implemented when the CPU 212 of the controller unit 205 executes the media mismatch determination function program loaded from the ROM 207 or the HDD 209 into the RAM 208. The CPU 212 performs the media mismatch determination according to the first exemplary embodiment in step S700 when the media mismatch determination button 1007 is pressed. When the media mismatch determination button 1007 is pressed again, the CPU 212 performs the media mismatch determination again, and updates the result of the determination.

In the first exemplary embodiment, print jobs selected by the user out of the print jobs currently displayed in the hold job list 1002, will be subjected to the processing described below. Although, in the present exemplary embodiment, print jobs selected by the user are subjected to the processing, the configuration is not limited thereto. All of print jobs stacked in the hold queue buffer 531 may be subjected to the processing described below. In the present exemplary embodiment, print jobs in which determination information of the sheet holding unit is a sheet type, are subjected to the processing described below. In a print job designating the sheet type, the CPU 212 instructs the media management unit 211 to refer to a sheet management table as illustrated in FIG. 15. An example sheet management table for managing information about sheets stored in respective sheet holding units of the digital printer 102 will be described below with reference to FIG. 15.

The sheet management table is stored in the HDD 209, and referred to by the CPU 212. Referring to the example illustrated in FIG. 15, for each of the 10 sheet holding units provided by the digital printer 102, information about a size 1512, a medium type 1513, and a remaining sheet amount 1514 are managed by using a sheet holding unit ID 1511 as a key. The sheet type is determined by the combination of the size 1512 and the media type 1513. The remaining sheet amount in each sheet holding unit is detected by a sensor provided therein.

For example, a column 1501 indicates that a sheet holding unit (ID=1) stores A4-size, medium type "PLAIN PAPER 1", and that the remaining sheet amount is 3. The remaining sheet amount 1514 has the following four different values: 3=FULL (100%), 2=SMALL REMAINING AMOUNT (25%), 1=VERY SMALL REMAINING AMOUNT (less than 5%), and 0=ZERO REMAINING AMOUNTING AMOUNT (0%). The accuracy in detecting a remaining sheet amount can be increased by improving the accuracy of the remaining amount sensor. However, the digital printer 102 according to the first exemplary embodiment performs remaining amount detection according to the above-described specifications. For example, FULL (100%) indicates a state where 3,000 sheets are stored in a sheet holding unit which accommodates storage of 3,000 sheets. SMALL REMAINING AMOUNT (25%) indicates a state where 750 sheets are stored in the sheet holding unit which accommodates storage of 3,000 sheets. VERY SMALL REMAINING AMOUNT (less than 5%) indicates a state where less than 150 sheets are stored in the sheet holding unit which accommodates storage of 3,000 sheets. ZERO REMAINING AMOUNTING AMOUNT (0%) indicates a state where no sheet is stored in the sheet holding unit which accommodates storage of 3,000 sheets. Thus, the sensor provided in each sheet holding unit can detect the remaining amount of sheets stored therein in three steps.

For example, a print job with a sheet type designation of A4 colored paper (red) refers to the sheet management table illustrated in FIG. 15 to determine whether A4 colored paper (red) is registered in any one of the sheet holding units. Then, as a result of the determination that a sheet holding unit (ID=2) stores A4-size medium type "COLORED PAPER (RED)", it is determined that the sheet holding unit (ID=2) is an applicable sheet feeding source.

In step S701, the CPU 212 determines whether there is one or more print jobs to be subjected to the media mismatch determination. When there is one or more print jobs to be subjected to the media mismatch determination (YES in step S701), the CPU 212 proceeds to step S702. On the other hand, when there is no print job to be subjected to the media mismatch determination (NO in step S701), the CPU 212 ends the media mismatch determination in step S700 of FIG. 7, and proceeds to step S900 of FIG. 6.

In step S702, the CPU 212 determines whether the media mismatch determination is completed for all of the print jobs subjected to the media mismatch determination. When the media mismatch determination is not completed for all of the print jobs subjected to the media mismatch determination (NO in step S702), the CPU 212 proceeds to step S703. On the other hand, when the media mismatch determination is completed for all of the print jobs subjected to the media mismatch determination (YES in step S702), the CPU 212 ends the media mismatch determination in step S700, and proceeds to step S900 of FIG. 6.

In step S703, the CPU 212 determines one print job to be subjected to the media mismatch determination. In step S800, the CPU 212 makes the media mismatch determination on the print job which designates a sheet, and returns to step S702.

Figure 8:
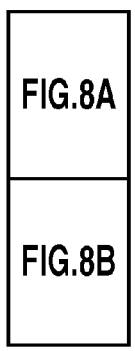
FIG. 8 includes FIG. 8A and FIG. 8B and is a flowchart illustrating the media mismatch determination (in step S800) for a print job with a sheet type designation illustrated in FIG. 7 in the digital printer according to the first exemplary embodiment.
Figure 8A:
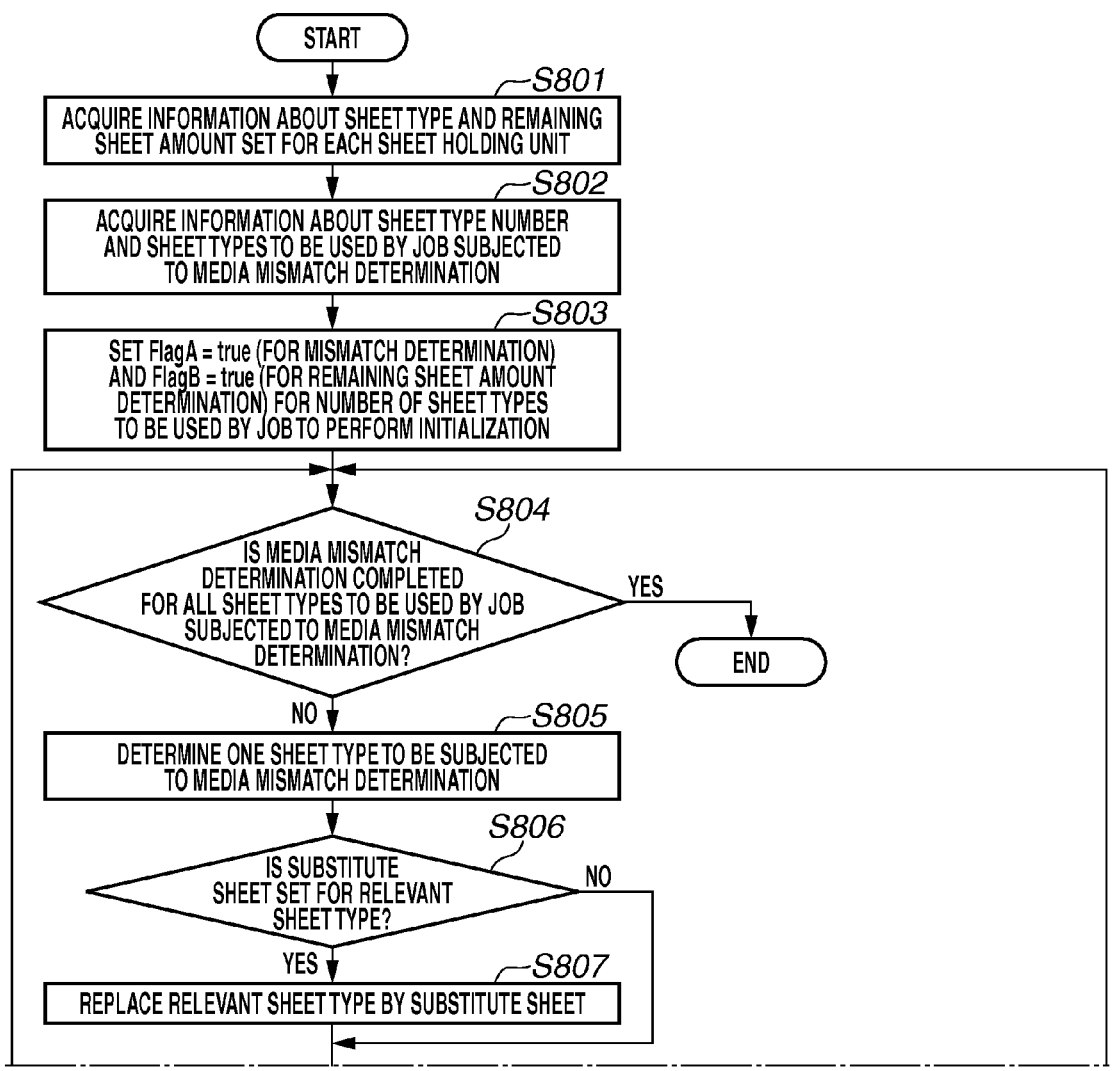
Figure 8B:
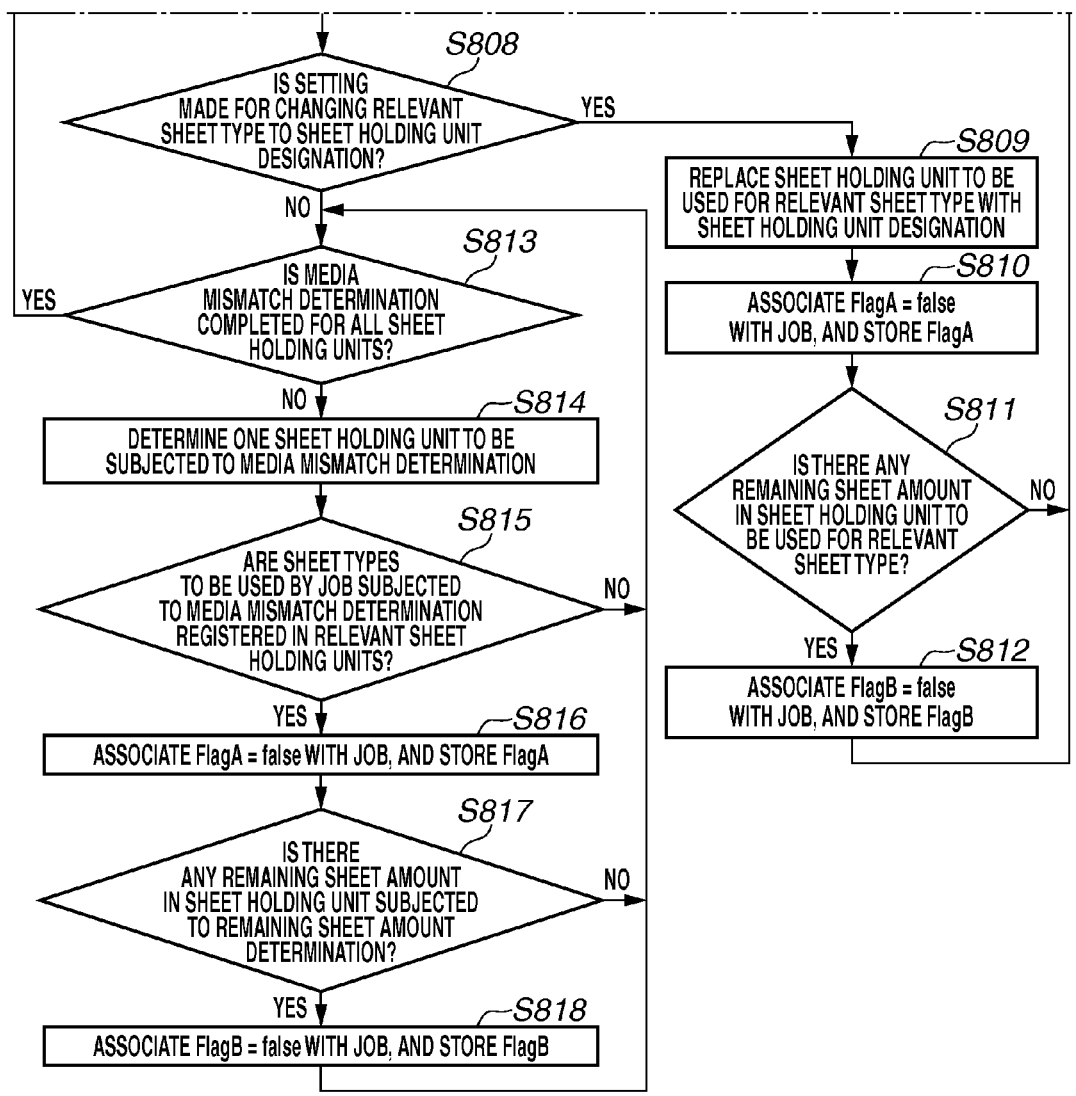

FIG. 8 is a flowchart illustrating the media mismatch determination (in step S800) on a print job designating a sheet. This processing is implemented when the CPU 212 of the controller unit 205 executes the media mismatch determination function program loaded from the ROM 207 or the HDD 209 into the RAM 208.

In step S801, the CPU 212 acquires information about the sheet and the remaining sheet amount set to each sheet holding unit provided in the digital printer 102. The processing in step S801 is implemented when the CPU 212 instructs the media management unit 211, for example, to refer to the sheet management table illustrated in FIG. 15. In step S802, the CPU 212 reads a print job stored in the hold queue buffer 531 out of print jobs subjected to the media mismatch determination. Then, the CPU 212 acquires the number of designated sheet types out of sheet types to be used by print jobs as illustrated in FIGS. 16A to 16C.

FIGS. 16A, 16B, and 16C illustrate information about sheets to be used by jobs Job A, Job D, and Job E illustrated in FIG. 10B, respectively. When the job hold function program stores a print job in the hold queue buffer 531, the information about sheets is retained therein by simultaneously storing the print settings. The sheet information to be used by the print job is included in the print settings. FIG. 16A illustrates that Job A uses two different sheets: an A4-size, medium type "PLAIN PAPER 1", and an A4-size, medium type "TWO-SIDED COATED PAPER 1". FIG. 16B illustrates that Job D uses two different sheets: a LTR-size, medium type "PLAIN PAPER 1", and an "11× 17"-size, medium type "PLAIN PAPER 1". Likewise, FIG. 16C illustrates that Job E uses three different sheets: an A4-size, medium type "PLAIN PAPER 1", an A4-size, medium type "COLORED PAPER (RED)", and an A3-size, medium type "TWO-SIDED COATED PAPER 2". The sheet type is determined by the combination of the size and the medium type.

In step S803, the CPU 212 sets two different flags (FlagA and FlagB) for retaining the result of the media mismatch determination for the number of sheet types acquired in step S802 to perform initialization. FlagA is used to retain the result of the determination whether the attribute information of a sheet to be used by the print job is registered in any one of the sheet holding units, and is stored in the RAM 208. On the other hand, FlagB is used to retain the result of the determination whether there is a certain remaining sheet amount of the sheet to be used by the print job, and is stored in the RAM 208. "FlagA=true" indicates a media mismatch (sheet type mismatch) state where the print job designates a sheet type which is not set to any sheet holding unit. On the other hand, "FlagB=true" indicates a media mismatch (zero remaining sheet amount) state where there is no remaining amount of a sheet type to be used by the print job. FlagA is initialized to "true (mismatch)", and FlagB is initialized to "true (zero remaining amount)".

In step S804, the CPU 212 determines whether the media mismatch determination is completed for all of sheet types to be used by the print job subjected to the media mismatch determination. When the CPU 212 determines that the media mismatch determination is completed not for all of sheet types to be used by the print job subjected to the media mismatch determination (NO in step S804), then in step S805, the CPU 212 determines one sheet type to be subjected to the media mismatch determination in the relevant print job, and proceeds to step S806.

In step S806, the CPU 212 determines whether the substitute sheet is set for the sheet type subjected to the media mismatch determination as decided in step S805. The processing flow for setting the substitute sheet (in step S1100) will be described in detail below with reference to FIG. 11. When the CPU 212 determines that the substitute sheet is set (YES in step S806), then in step S807, the CPU 212 replaces the relevant sheet type subjected to the media mismatch determination with the substitute sheet, and proceeds step S808. On the other hand, when the CPU 212 determines that the substitute sheet is not set (NO in step S806), the CPU 212 proceeds to step S808.

In step S808, the CPU 212 determines whether the sheet type subjected to the media mismatch determination as decided in step S805 is set to change to a sheet holding unit designation. For example, in a print job designating a sheet holding unit, if a sheet holding unit (ID=3) is designated as sheet holding unit determination information, the sheet management table illustrated in FIG. 15 is referred to, and A3-size, "PLAIN PAPER 1" stored in the sheet holding unit (ID=3) is fed.

The flowchart of processing for changing the sheet setting to a sheet holding unit designation (in step S1200) will be described in detail below with reference to FIG. 12.

When the CPU 212 determines that the sheet subjected to the media mismatch determination is set to change to a sheet holding unit designation (YES in step S808), then in step S809, instead of performing the media mismatch determination (in steps S813 to S818), the CPU 212 replaces the sheet holding unit to be used for the relevant sheet type subjected to the media mismatch determination, with the designated sheet holding unit. In step S810, the CPU 212 associates the value of FlagA with the print job as "false (match)", and stores FlagA. Then in step S811, the CPU 212 determines whether there is a certain remaining amount of sheets in the sheet holding unit replaced in step S809 as the sheet holding unit to be used for the relevant sheet type. When the CPU 212 determines that there is a certain remaining sheet amount in the relevant sheet holding unit (YES in step S811), then in step S812, the CPU 212 associates the value of FlagB with the print job as "false (there is a certain remaining amount)" indicating that there is a certain remaining sheet amount of the sheet type to be used by the print job, and stores FlagB. Then, the CPU 212 returns to step S804, and proceeds to subsequent processing. On the other hand, when the CPU 212 determines that there is no remaining sheet amount in the relevant sheet holding unit (NO in step S811), the CPU 212 returns to step S804, and proceeds to subsequent processing.

On the other hand, when the CPU 212 determines that the sheet subjected to the media mismatch determination is not set to change to a sheet holding unit designation (NO in step S808), then in step S813, the CPU 212 determines whether the media mismatch determination is completed for all of the sheet holding units provided in the digital printer 102. When the media mismatch determination is determined to be completed not for all of the sheet holding units (NO in step S813), then in step S814, the CPU 212 determines one sheet holding unit to be subjected to the subsequent media mismatch determination, and proceeds to step S815.

In step S815, the CPU 212 determines whether the sheet subjected to the media mismatch determination as decided in step S805 (or the substitute sheet type replaced in step S807) corresponds to the sheet type registered in the sheet holding unit subjected to the media mismatch determination as decided in step S814. When the CPU 212 determines that the relevant two sheets correspond to each other (YES in step S815), the CPU 212 proceeds to step S816. On the other hand, when the CPU 212 determines that the relevant two sheets do not correspond to each other (NO in step S815), the CPU 212 returns to step S813, and proceeds to subsequent processing.

In step S816, the CPU 212 associates the value of FlagA with the print job as "false (match)" indicating that the print job designates the sheet type registered in the sheet holding unit, and stores FlagA. In step S817, the CPU 212 determines whether there is a certain remaining sheet amount in the sheet holding unit subjected to the media mismatch determination as decided in step S814. When the CPU 212 determines that there is a certain remaining sheet amount in the relevant sheet holding unit (YES in step S817), then in step S818, the CPU 212 associates the value of FlagB with the print job as "false (there is a certain remaining amount)" indicating that there is a certain remaining sheet amount of the sheet type to be used by the print job, and stores FlagB. Then, the CPU 212 returns to step S813, and proceeds to subsequent processing. On the other hand, when the CPU 212 determines that there is no remaining sheet amount in the relevant sheet holding unit (NO in step S817), the CPU 212 returns to step S813, and proceeds to subsequent processing.

When the CPU 212 determines that the media mismatch determination has been made for all of the sheet holding units (YES in step S813), the CPU 212 returns to step S804, and proceeds to subsequent processing. When the CPU 212 determines that the media mismatch determination has been made for all of sheet types to be used by the print job subjected to the media mismatch determination (YES in step S804), the CPU 212 ends the media mismatch determination processing in step S800 which is performed on the print job designating a sheet type, and returns to step S702 of FIG. 7. This completes detailed descriptions of the media mismatch determination for the print job designating a sheet type in step S800 of FIG. 7.

Although, in step S807, the CPU 212 replaces the relevant sheet subjected to the mismatch determining with the substitute sheet type and then proceeds to step S808 to perform subsequent processing, the processing is not limited thereto. In step S807, the CPU 212 may replace the relevant sheet subjected to the mismatch determining with the substitute sheet type, and then proceed to step S810 to perform subsequent processing. This means that, when the relevant sheet subjected to the mismatch determining is replaced with the substitute sheet, the CPU 212 associates the value of FlagA with the print job as "false (match)", and stores FlagA, without making the media mismatch determination (in steps S813 to S818).

FIG. 9 is a flowchart illustrating the processing in step S900 of FIG. 6, more specifically, the processing for notifying the hold job list 1002 of the result of the media mismatch determination. This processing is implemented when the CPU 212 of the controller unit 205 executes the UI function program loaded from the ROM 207 or the HDD 209 into the RAM 208. When the media mismatch determination is made again, the result of the media mismatch determination notified on the hold job list 1002 is updated.

In step S901, the CPU 212 determines whether the print job having undergone the media mismatch determination is displayed in the hold job list 1002. When the CPU 212 determines that the print job having undergone the media mismatch determination is displayed in the hold job list 1002 (YES in step S901), the CPU 212 proceeds to step S902.

In step S902, the CPU 212 reads from the RAM 208 the value of FlagA for retaining the result of the sheet type mismatch determination. In the sheet type mismatch determination, the CPU 212 determines whether the attribute information of the sheet used by the print job having undergone the media mismatch determination is registered in any one of the sheet holding units. Then, the CPU 212 determines whether the value of FlagA is "false (match)".

When it is determined that the value of FlagA is "true (mismatch)" for at least one sheet type (NO in step S902), it indicates the media mismatch (sheet type mismatch) state where the relevant print job designates a sheet type which is not set to any sheet holding unit. In this case (NO in step S902), then in step S903, as illustrated in FIG. 10C for example, the CPU 212 displays a sheet type mismatch warning mark (hereinafter simply referred to as mismatch mark) 1031 in an entry of the print job in the hold job list 1002 to indicate that the job is in the media mismatch state. The mismatch mark 1031 indicates that a certain sheet type (size and medium type) to be used by the print job is not set to any sheet holding unit. Then, the CPU 212 ends a series of processing for the media mismatch determination result notification in step S900, and returns to step S601 of FIG. 6.

On the other hand, when it is determined that the value of FlagA is "false (match)" for all of sheets (YES in step S902), then in step S904, the CPU 212 reads the value of FlagB from the RAM 208, and determines whether the value of FlagB is "false (there is a certain remaining amount)". FlagB is used to retain the result of the remaining sheet amount determination in which the CPU 212 determines whether there is a certain remaining sheet amount of the sheet to be used by the print job having undergone the media mismatch determination.

When the value of FlagB is determined to be "true (zero remaining amount)" for at least one sheet type (NO in step S904), it indicates the media mismatch (zero remaining sheet amount) state where there is no remaining amount of sheets of the sheet type to be used by the print job. In this case (NO in step S904), in step S905, as illustrated in FIG. 10C, for example, the CPU 212 displays a zero remaining sheet amount warning mark (hereinafter simply referred to as zero remaining amount mark) 1032 in association of the print job in an entry of the print job in the hold job list 1002 to indicate that the print job is in the media mismatch state. The zero remaining amount mark 1032 indicates that there is no remaining amount of sheets although the relevant sheet to be used by the print job is set to the sheet holding unit. Then, the CPU 212 ends a series of processing for the media mismatch determination result notification in step S900, and returns to step S601 of FIG. 6. On the other hand, when the value of FlagB is determined to be "false" for all of sheet types (YES in step S904), there is a certain remaining amount of sheets for all of sheet types to be used by the print job. If the mismatch mark 1031 or the zero remaining amount mark 1032 are displayed in the hold job list 1002 as a result of the media mismatch determination before updating the result of the media mismatch determination, these warning marks will disappear. Then, the CPU 212 ends a series of processing for the media mismatch determination result notification in step S900, and returns to step S601 of FIG. 6.

In the above descriptions, as a result of making the media mismatch determination, the CPU 212 notifies the user of a print job in which sheet type mismatch has occurred, by displaying the mismatch mark 1031 in association with the the relevant job in step S903. Further, the CPU 212 notifies the user of a print job in which zero remaining sheet amount has occurred, by displaying the zero remaining amount mark 1032 in association with the relevant job in step S905. However, the processing is not limited thereto. As long as the user is able to make sure that sheet type mismatch or zero remaining sheet amount has occurred in a print job before issuing an instruction for executing the relevant job, the present invention is applicable. The CPU 212 may notify the user that sheet type mismatch or zero remaining sheet amount has occurred by using other recognizable marks, sound, and light.

An example operation screen after notifying the hold job list 1002 of the result of the media mismatch determination in the digital printer 102 according to the first exemplary embodiment will be described below with reference to FIG. 10C. On the other hand, FIG. 10B illustrates example display immediately after the operator A operates the job hold function operation screen displayed on the operation unit 204 and selects a print job. Referring to FIG. 10C, components equivalent to those in FIG. 10B are assigned the same reference numerals. Similar to FIG. 10B, in FIG. 10C, the operator A has selected three jobs (Job A, Job D, and Job E) in this order.

Referring to FIG. 10C, for each of the three jobs (Job A, Job D, and Job E) selected by the user, the CPU 212 checks the consistency between the sheets to be used by each print job and the sheets registered in the respective sheet holding units of the digital printer 102 (media mismatch determination).

For example, in Job A, the sheets to be used by the print job are registered in the relevant sheet holding units, and the remaining sheet amounts are not zero, as illustrated in FIGS. 15 and 16A. Therefore, neither the mismatch mark 1031 nor the zero remaining amount mark 1032 is displayed on Job A. In this case, the user is able to know, before instructing to start printing, that there is a very low possibility that media mismatch occurs when the the START PRINTING button 1012 is pressed.

In job D, the sheets to be used by the print job are registered in the sheet holding units but there is no remaining amount of sheets of a certain sheet, as illustrated in FIGS. 15 and 16A. Specifically, there is no remaining amount of sheets having the "11×17"-size, medium type "PLAIN PAPER 1" set in the "sheet holding unit 9". Therefore, when the START PRINTING button 1012 is pressed in this state, media mismatch (zero remaining sheet amount) occurs at the timing of feeding the "11×17"-size sheet, and the print processing stops. Therefore, the zero remaining amount mark 1032 is displayed on Job D. When the user recognizes that the zero remaining amount mark 1032 is displayed, the user can take a suitable action, more specifically, supply the "11×17"-size, medium type "PLAIN PAPER 1" to the sheet holding unit 9.

In Job E, a certain sheet to be used by the print job is not set to any sheet holding unit, as illustrated in FIGS. 15 and 16C. Specifically, the A3-size, medium type "TWO-SIDED COATED PAPER 2" is not set to any sheet holding unit. Therefore, the mismatch mark 1031 is displayed on Job E. When the DETAILS button 1011 is pressed in the state of FIG. 10C, the sheet size and the medium type (for example, FIG. 16C) to be used by Job E in the selected state are displayed. In this case, for example, the medium information which is not set to any sheet holding unit (A3-size TWO-SIDED COATED PAPER 2) is highlighted to present to the user a sheet which is not set to any sheet holding unit.

Therefore, the user is able to know, before instructing to start printing, that media mismatch (sheet type mismatch) will occur and the print job will stop at the timing of pressing the START PRINTING button 1012 to feed a sheet of the relevant type.

In the present exemplary embodiment, as illustrated in FIG. 10C, the mismatch mark 1031 and the zero remaining amount mark 1032 have different shapes. This enables the user to distinguish between a case where a certain sheet to be used by the job is not set to any sheet holding unit and a case where there is no remaining sheet amount although the relevant sheet is registered in any one of the sheet holding units. If the media mismatch determination is made in this way, the mismatch mark 1031 or the zero remaining amount mark 1032 can be displayed in association with a print job in which media mismatch may possibly occur. Thus, the user can avoid stopping the print job.

When the user selects Job D and presses the DETAILS button 1011 in the state illustrated in FIG. 10C, the sheet size and the medium type (for example, FIG. 16B) to be used by Job D are displayed. At this timing, the CPU 212 blinks the sheet information indicating a zero remaining sheet amount. The CPU 212 further blinks display of the sheet holding unit to which the relevant sheet is set. This enables the user to obtain sheet information about the sheet size and the medium type to be used by Job D, together with a zero remaining sheet amount, and the relevant sheet holding unit. Thus, when displaying the sheet size and the medium type, the sheet information is displayed in different ways between a case where the relevant sheet is not set to any sheet holding unit and a case where there is no remaining sheet amount. This enables the user to distinguish between a case where the sheet of the displayed size and media type is not set to any sheet holding unit and a case where there is no remaining sheet amount. Although, in the above-described example, the sheet information about a medium type which is not set to any sheet holding unit is highlighted, and the sheet information about the zero remaining sheet amount is blinked. However, the display method is not limited thereto. The mismatch mark 1031 and the zero remaining amount mark 1032 may also be displayed in association with each other on respective sheet information as warnings.

Figure 11:
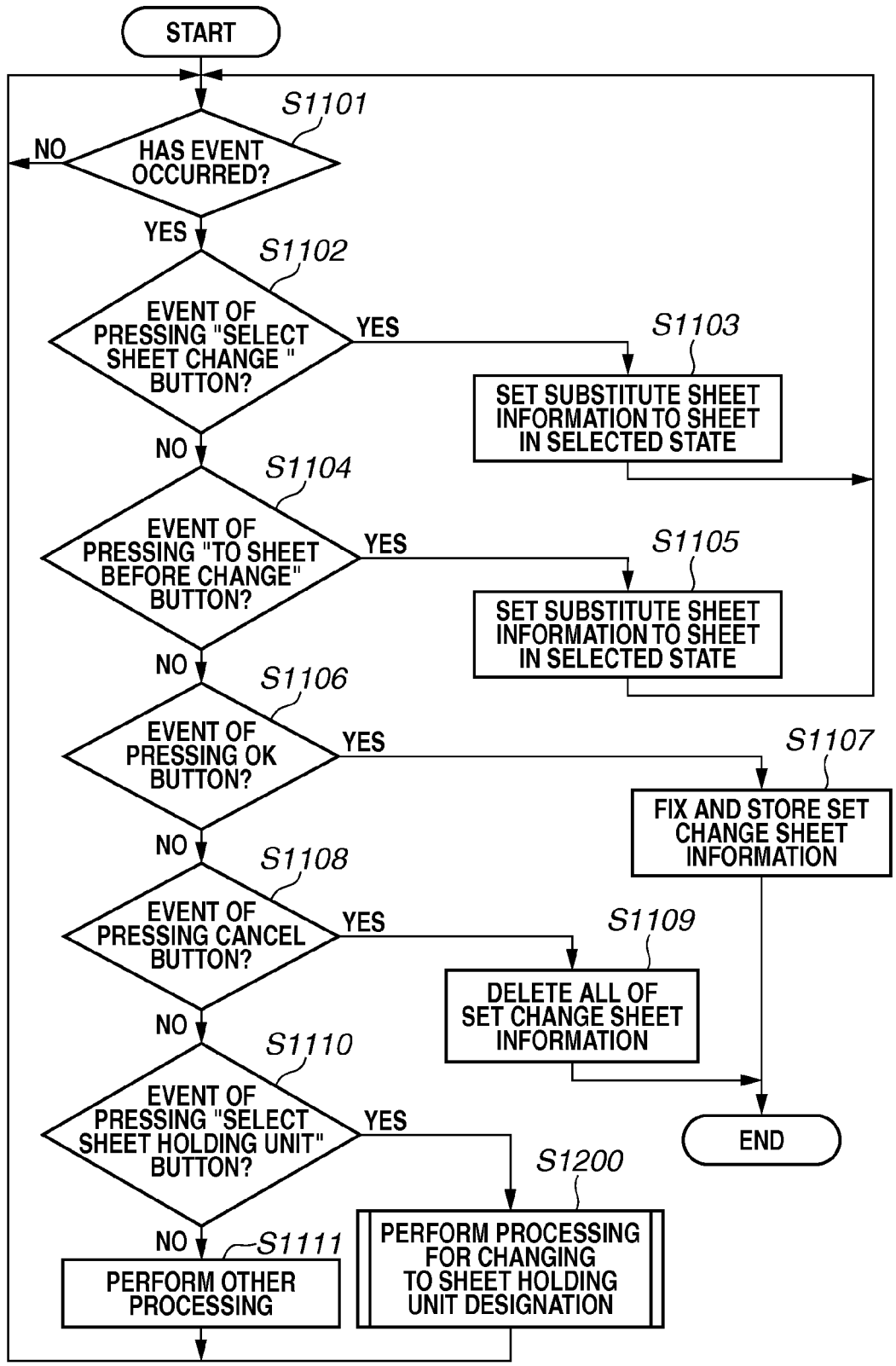
FIG. 11 is a flowchart illustrating the sheet change processing (in step S1100) illustrated in FIG. 6 in the digital printer according to the first exemplary embodiment.
Figure 14A:
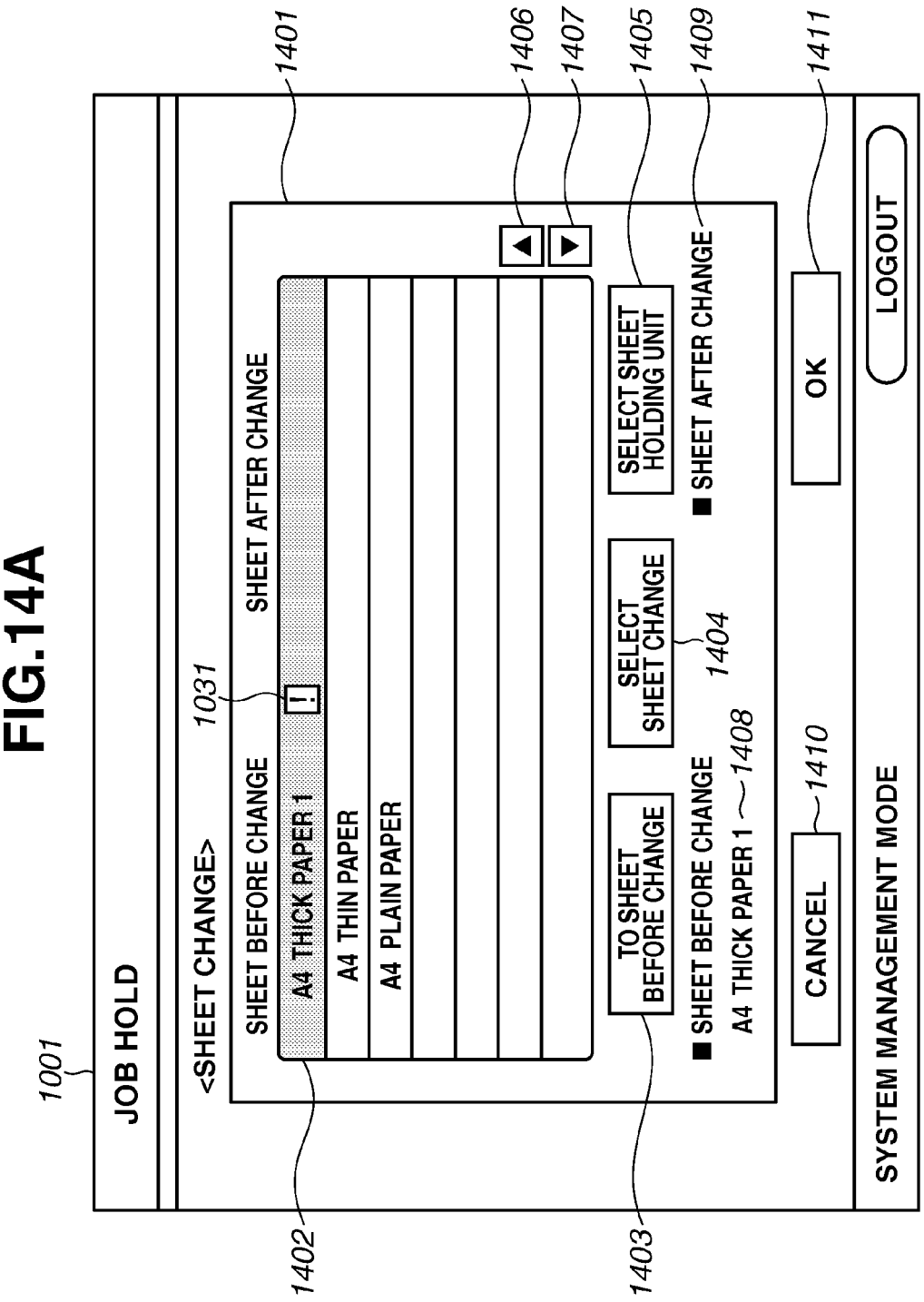

FIG. 11 is a flowchart illustrating the processing in step S1100 of FIG. 6 for changing a sheet to be used by the selected print job. This processing is implemented when the CPU 212 of the controller unit 205 executes the UI function program loaded from the ROM 207 or the HDD 209 into the RAM 208. The processing of the flowchart illustrated in FIG. 11 is started in a state where a SHEET CHANGE screen 1401 illustrated in FIG. 14A is displayed on the operation unit 204, and a sheet has already been selected from a list of sheets to be used by the job as illustrated in a column 1402. Referring to the example illustrated in FIG. 14A, the list of sheets to be used by the job displays "A4 THICK PAPER 1", "A4 THIN PAPER", and "A4 PLAIN PAPER", and the mismatch mark 1031 is given to "A4 THICK PAPER 1". "A4 THICK PAPER 1" is selected by the user. Although sheet change processing for a mismatch sheet type (mismatch sheet) is described below, the processing is not limited thereto. Sheet change processing without performing media mismatch (non-mismatch sheet) may also be permitted.

In step S1101, the CPU 212 waits for a user operation on the SHEET CHANGE screen 1401 illustrated in FIG. 14A displayed on the operation unit 204. In this case, the CPU 212 repeats step S1101 until the user performs a certain operation. When the user performs a certain operation on the operation unit 204 (YES in step S1101), the CPU 212 proceeds to step S1102.

In step S1102, the CPU 212 determines whether the user operation is an event of pressing the SELECT SHEET CHANGE button 1404 illustrated in FIG. 14A. When the sheet before change is not in the selected state, the SELECT SHEET CHANGE button 1404 may be grayed out (disabled). When the user operation is determined to be an event of pressing the SELECT SHEET CHANGE button 1404 (YES in step S1102), the CPU 212 proceeds to step S1103.

In step S1103, the CPU 212 sets information about the substitute sheet selected from among the substitute sheet candidates by the user, to the sheet before change in the selected state, and returns to step S1101. The substitute sheet information which can be set in step S1103 is sheet information already stored as setting values for the sheet holding unit.

On the other hand, when it is determined that the user operation is not an event of pressing the SELECT SHEET CHANGE button 1404 (NO in step S1102), the CPU 212 proceeds to step S1104.

In step S1104, the CPU 212 determines whether the user operation is an event of pressing a TO SHEET BEFORE CHANGE button 1403 illustrated in FIG. 14A. When it is determined that the user operation is an event of pressing the TO SHEET BEFORE CHANGE button 1403 (YES in step S1104), the CPU 212 proceeds to step S1105. The TO SHEET BEFORE CHANGE button 1403 is grayed out (disabled) for sheets to which the change sheet information is not set.

In step S1105, the CPU 212 deletes the change sheet information set to the sheet before change in the selected state, and returns to step S1101.

On the other hand, when it is determined that the user operation is not an event of pressing the TO SHEET BEFORE CHANGE button 1403 (NO in step S1104), the CPU 212 proceeds to step S1106.

In step S1106, the CPU 212 determines whether the user operation is an event of pressing an OK button 1411 illustrated in FIG. 14A. When the CPU 212 determines that the user operation is an event of pressing the OK button 1411 (YES in step S1106), then in step S1107, the CPU 212 sets the set change sheet information to the sheet to be used by the print job in association with the relevant print job, and stores the relevant information in the HDD 209. Then, the CPU 212 ends the processing for changing the sheet to be used by the print job in step S1100 of FIG. 6, and returns to step S601 of FIG. 6.

On the other hand, when the CPU 212 determines that the user operation is not an event of pressing the OK button 1411 (NO in step S1106), then in step S1108, the CPU 212 determines whether the user operation is an event of pressing the CANCEL button 1410 illustrated in FIG. 14A. When the CPU 212 determines that the user operation is an event of pressing the CANCEL button 1410 (YES in step S1108), then in step S1109, the CPU 212 cancels all of the change sheet information set to the sheet to be used by the print job. Then, the CPU 212 ends the processing for changing the sheet to be used by the print job in step S1100 of FIG. 6, and returns to step S601 of FIG. 6.

On the other hand, when the CPU 212 determines that the user operation is an event of pressing the CANCEL button 1410 (NO in step S1108), then in step S1110, the CPU 212 determines whether the user operation is an event of pressing the SELECT SHEET HOLDING UNIT button 1405. When the CPU 212 determines that the user operation is an event of pressing the SELECT SHEET HOLDING UNIT button 1405 (YES in step S1110), the CPU 212 proceeds to step S1200. The contents of the processing in step S1200 will be described below with reference to FIG. 12. After completion of the processing in step S1200, the CPU 212 returns to step S1101.

On the other hand, when the CPU 212 determines that the user operation is not an event of pressing the SELECT SHEET HOLDING UNIT button 1405 (NO in step S1110), then in step S1111, the CPU 212 performs other processing according to the user operation, and returns to step S1101. The processing in step S1111 is, for example, sequentially displaying the information of all of sheets to be used by the selected print job by pressing the scroll buttons 1406 and 1407.

The above is the detailed description of the processing in step S1100 of FIG. 6, i.e., the sheet change processing for a sheet to be used by a print job. Although the substitute sheet information which can be set in step S1103 is sheet information already stored as setting values for the sheet holding units, the sheet information is not limited thereto. Sheet information which is not stored as setting values for the sheet holding units may be selected. In this case, the user may store afterward the information about the selected sheet as setting values for the sheet holding units.

Figure 12:
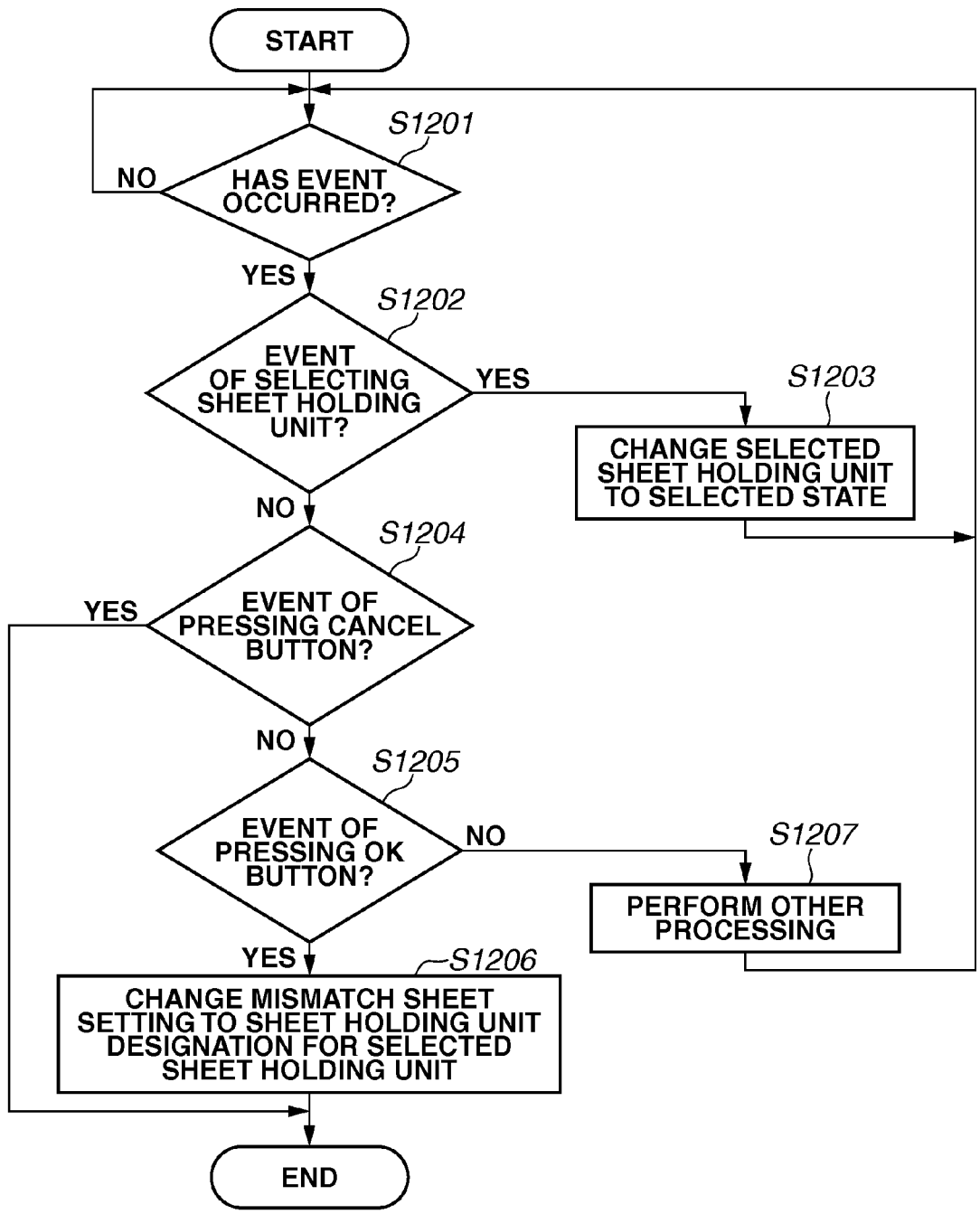
FIG. 12 is a flowchart illustrating processing for changing the sheet setting to a sheet holding unit designation (in step S1200) illustrated in FIG. 11 in the digital printer according to the first exemplary embodiment.

FIG. 12 is a flowchart illustrating the processing in step S1200 of FIG. 11, more specifically, sheet feeding control processing for changing a sheet to be used by a print job according to the first exemplary embodiment, to a sheet designating a sheet holding unit. This processing is implemented when the CPU 212 of the controller unit 205 executes the UI function program loaded from the ROM 207 or the HDD 209 into the RAM 208.

Figure 14B:
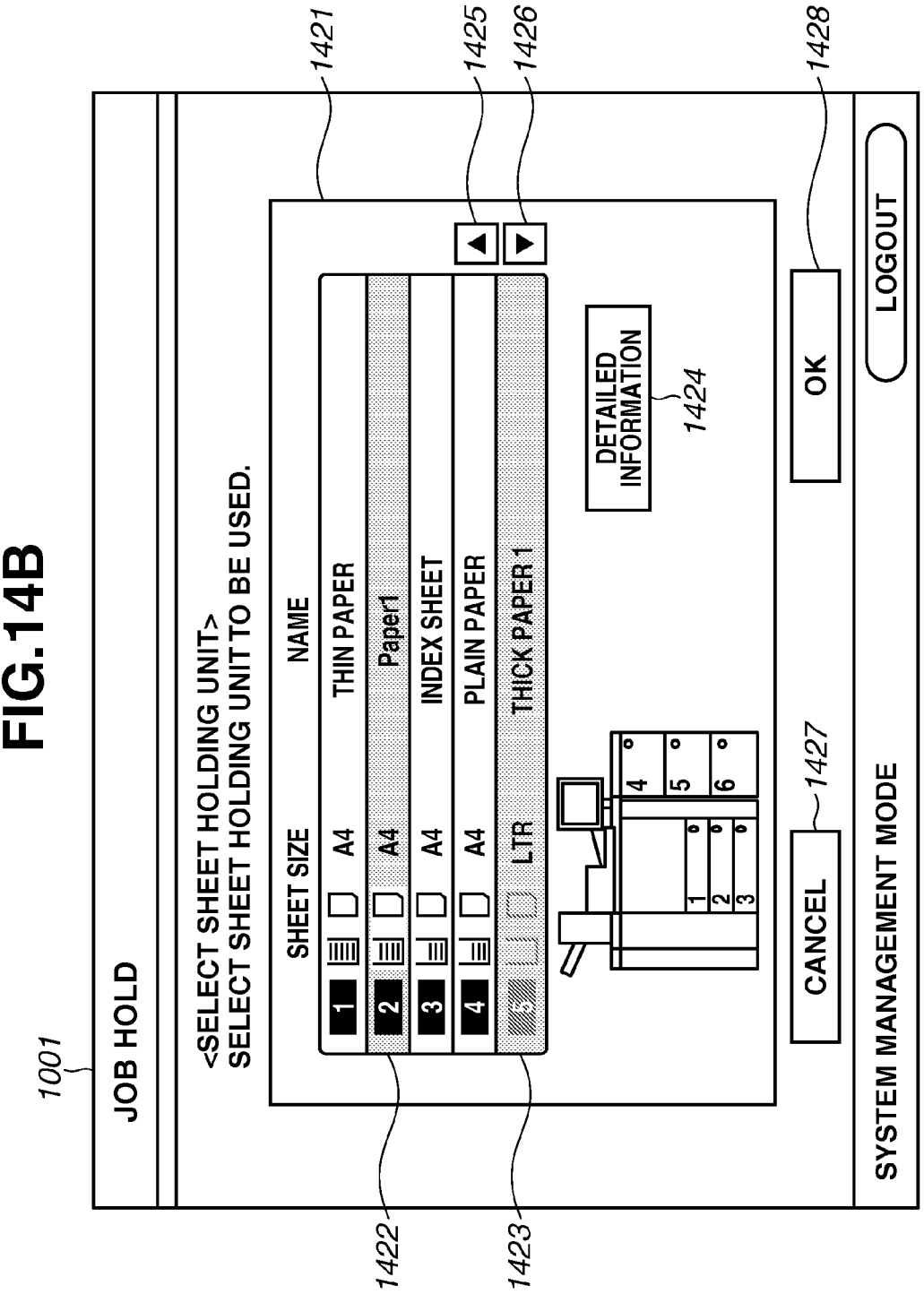

In step S1201, the CPU 212 waits for a user operation on the SHEET FEEDING UNIT SELECTION screen 1421 illustrated in FIG. 14B displayed on the operation unit 204. In this case, the CPU 212 repeats step S1201 until the user performs a certain operation. When the user performs a certain operation on the operation unit 204 (YES in step S1201), the CPU 212 proceeds to step S1202.

In step S1202, the CPU 212 determines whether the user operation is an event of selecting a sheet holding unit. When the CPU 212 determines that the user operation is an event of selecting a sheet holding unit (YES in step S1202), then in step S1203, the CPU 212 changes the sheet holding unit selected by the user to the select state, and returns to step S1201. The user can select only one sheet holding unit at one time on the SHEET HOLDING UNIT SELECTION screen 1421. A sheet holding unit having zero remaining sheet amount among all the sheet holding units provided by the digital printer 102 may be grayed out and cannot be selected. Referring to the example illustrated in FIG. 14B, a sheet holding unit 5 displayed in a column 1423 has zero remaining sheet amount, and therefore is grayed out and cannot be selected. On the other hand, "SHEET HOLDING UNIT 2" displayed in a column 1422 has a certain remaining sheet amount and is selected by the user (highlighted).

On the other hand, when the CPU 212 determines that the user operation is not an event of selecting a sheet holding unit (NO in step S1202), then in step S1204, the CPU 212 determines whether the user operation is an event of pressing a CANCEL button 1427.

When the CPU 212 determines that the user operation is an event of pressing the CANCEL button 1427 (YES in step S1204), the CPU 212 ends the processing in step S1200 of FIG. 11, more specifically, sheet feeding control processing for changing the sheet setting to a sheet holding unit designation, and returns to step S1101 of FIG. 11. On the other hand, when the CPU 212 determines that the user operation is not an event of pressing the CANCEL button 1427 (NO in step S1204), the CPU 212 proceeds to step S1205.

In step S1205, the CPU 212 determines whether the user operation is an event of pressing the OK button 1428. When the CPU 212 determines that the user operation is an event of pressing the OK button 1428 (YES in step S1205), the CPU 212 proceeds to step S1206. When no sheet holding unit is selected, the OK button 1428 is grayed out and cannot be selected. Therefore, once an event of selecting a sheet holding unit occurs, the CPU 212 sets the sheet holding unit to the selected state in step S1203, and returns to step S1201. Then, the OK button 1428 is enabled.

In step S1206, the CPU 212 changes the mismatch sheet setting to a sheet holding unit designation which is changed to the selected state in step S1203. For example, as indicated by texts 1408 and 1409 illustrated in FIG. 14C, the setting "A4 THICK PAPER 1" as a sheet before change is changed to a sheet holding unit designation for designating "SHEET HOLDING UNIT 2" selected by the user.

Then, the CPU 212 ends the processing in step S1200 of FIG. 11, more specifically, a series of sheet feeding control processing for changing the sheet setting to a sheet holding unit designation, and returns to step S1101 of FIG. 11.

On the other hand, when the CPU 212 determines that the user operation is not an event of pressing the OK button 1428 (NO in step S1205), then in step S1207, the CPU 212 performs other processing according to the user operation. Detailed processing in step S1207 is, for example, selecting a sheet holding unit, and pressing a DETAILED INFORMATION button 1424 illustrated in FIG. 14B to make a transition to a screen for calling the attribute information of the sheet registered in the sheet holding unit in the selected state. After performing other processing in step S1207, the CPU 212 returns to step S1201, and proceeds to subsequent processing.

Figure 13:
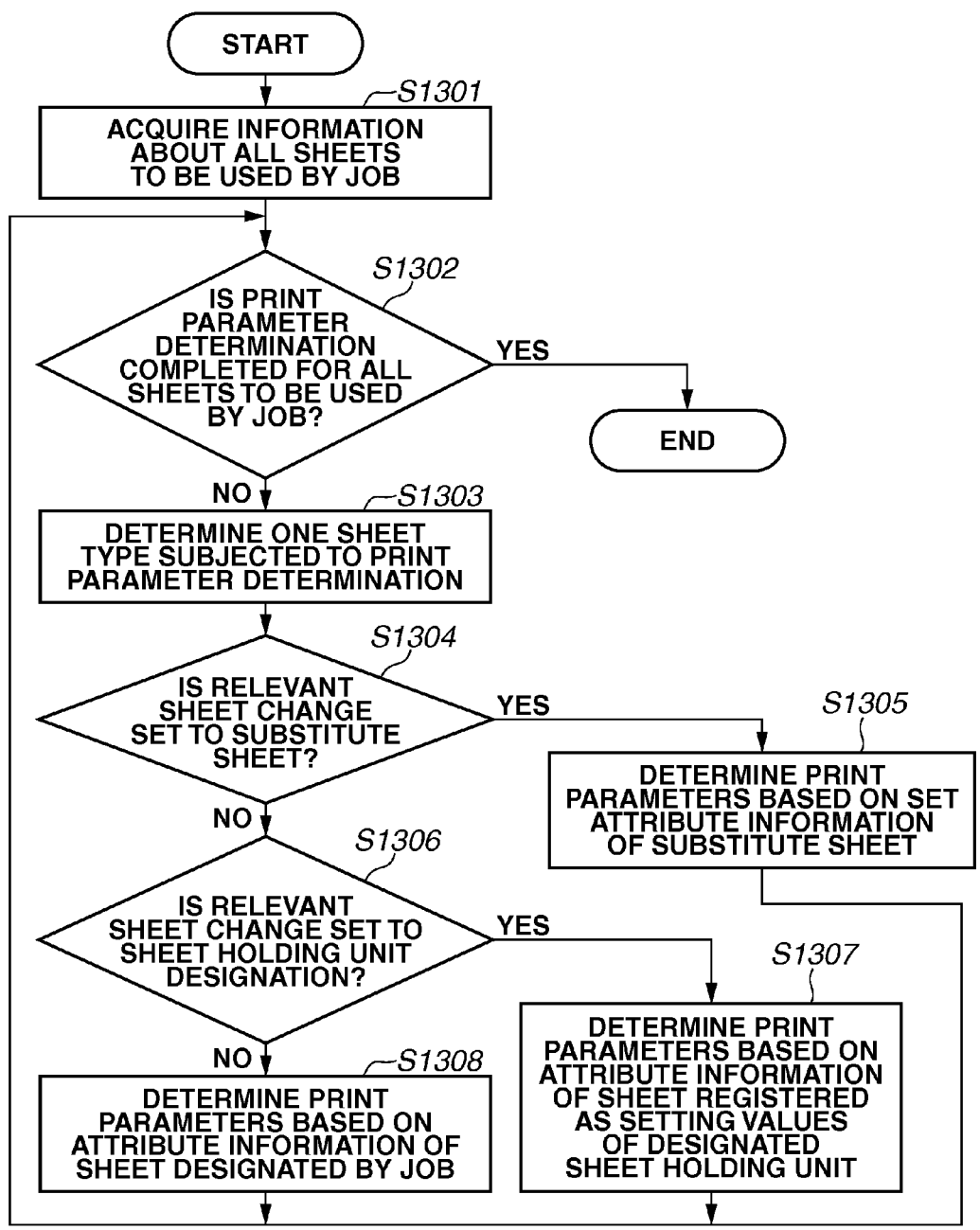
FIG. 13 is a flowchart illustrating processing for determining print parameters of sheets to be used by a job in the digital printer according to the first exemplary embodiment.

The above is a detailed description of the processing in step S1200 of FIG. 11, more specifically, the sheet feeding control processing for changing a sheet to be used by a print job to a sheet holding unit designation FIG. 13 is a flowchart illustrating the printing control processing for determining print parameters when a job starts printing. This processing is implemented when the CPU 212 of the controller unit 205 executes the JDF function program or the PDL function program loaded from the ROM 207 or the HDD 209 into the RAM 208. Further, this processing is performed for the jobs stacked in the print queue buffer 521 for which a print execution instruction is given. The print parameters refers to parameters for controlling the sheet conveyance speed and the fixing unit temperature. The sheet attribute information as a basis for determining the print parameters refers to such information as the sheet grammage and the sheet.

In step S1301, the CPU 212 acquires information about all of sheets to be used by a job, and proceeds to step S1302. The information acquired in step S1301 includes, for example, the sheet size, the media type, the presence or absence of the setting for changing to the substitute sheet, and the presence or absence of the setting for changing to a sheet holding unit designation.

In step S1302, the CPU 212 determines whether the print parameter determination is completed for all of sheets to be used by the job. When the CPU 212 determines that the print parameter determination has been made (YES in step S1302), the CPU 212 ends a series of the processing for determining the print parameters. On the other hand, when the CPU 212 determines that the print parameter determination has not been made (NO in step S1302), the CPU 212 proceeds to step S1303.

In step S1303, the CPU 212 determines one sheet for determining the print parameters out of sheets to be used by the job. In step S1304, the CPU 212 determines whether the sheet determined in step S1303 is set to change to the substitute sheet. When the CPU 212 determines that the relevant sheet is set to change to the substitute sheet (YES in step S1304), then in step S1305, the CPU 212 determines the print parameters based on the attribute information of the set substitute sheet, and returns to step S1302.

On the other hand, when CPU 212 determines that the relevant sheet is not set to change to the substitute sheet (NO in step S1304), then in step S1306, the CPU 212 determines whether the relevant sheet is set to change to a sheet holding unit designation in step S1206 of FIG. 12. When the CPU 212 determines that the relevant sheet is set to change to a sheet holding unit designation (YES in step S1306), then in step S1307, the CPU 212 determines the print parameters based on the sheet attribute information registered as setting values for the designated sheet holding unit.

Referring to the example illustrated in FIG. 14C, the mismatch sheet "A4 THICK PAPER 1" has been changed to a sheet holding unit designation of "SHEET HOLDING UNIT 2". Therefore, print parameters are determined based on the attribute information of "A4 Paper1" registered in "SHEET HOLDING UNIT 2" designated by sheet holding unit designation. After completion of the processing in step S1307, the CPU 212 returns to step S1302.

On the other hand, when the CPU 212 determines that the sheet is not set to change to a sheet holding unit designation (NO in step S1306), then in step S1308, the CPU 212 determines print parameters based on the attribute information of the sheet designated by the job as a sheet to be used by the job, and returns to step S1302.

Referring to the example illustrated in FIG. 14A, since the mismatch sheet "A4 THICK PAPER 1" has not yet been changed to a sheet holding unit designation, print parameters are determined based on "A4 THICK PAPER 1" which is the attribute information of the sheet designated by the job.

The above is a detailed description of the printing control processing for determining print parameters when a job starts printing.

As described above, in the first exemplary embodiment, when the attribute information of a sheet to be used by a print job is not registered in any sheet holding unit, the CPU 212 changes the sheet feeding source information of the relevant mismatch sheet from a sheet designation to a sheet holding unit designation. Specifically, when the user selects a sheet holding unit from which the mismatch sheet is to be fed, the CPU 212 performs control to feed the mismatch sheet from the sheet holding unit selected by the user. Thus, the media mismatch state can be resolved, and the user can confirm the relevant situation. Further, when the sheet is changed to a sheet holding unit designation, print parameters can be determined based on the attribute information registered as setting values for the designated sheet holding unit.

In the above-described first exemplary embodiment, when the sheet feeding source information of a media mismatch job is changed from a sheet designation to a sheet holding unit designation, print parameters are determined based on the attribute information of the sheet registered in the designated sheet holding unit.

However, there is a case where, even after the user has changed a sheet to be used by a sheet mismatch job to a sheet holding unit designation, the user wants to determine print parameters based on the attribute information of the sheet designated by the job.

In this regard, the second exemplary embodiment, in a case where a sheet to be used by a sheet mismatch job is changed to a sheet holding unit designation, print parameters are determined based on the attribute information of the sheet designated by the job.

A series of flowcharts illustrating processing by the digital printer 102 according to the second exemplary embodiment is similar to the flowcharts illustrated in FIGS. 6 to 9 and FIGS. 11 to 13 described in the first exemplary embodiment, and redundant descriptions thereof will be omitted.

Figure 17A:
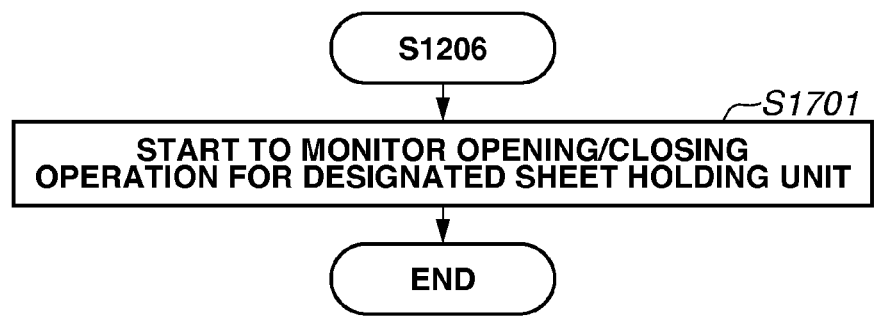
FIGS. 17A, 17B, and 17C are flowcharts illustrating processing by a digital printer according to a second exemplary embodiment different from processing by the digital printer according to the first exemplary embodiment.

The second exemplary embodiment differs from the first exemplary embodiment in the processing in step S1206 and subsequent steps of FIG. 6. Therefore, the processing in step S1206 and subsequent steps according to the second exemplary embodiment will be described in detail below with reference to the flowchart illustrated in FIG. 17A.

In step S1206, after the CPU 212 changes the sheet setting of the sheet to be used by the job to a sheet holding unit designation for designating the sheet holding unit which has been changed to the selected state in step S1203, and proceeds to step S1701.

In step S1701, the CPU 212 starts monitoring the opening/closing operation of the sheet holding unit designated by sheet holding unit designation via an open/close sensor (not illustrated) provided in each sheet holding unit. Then, the CPU 212 ends the processing in step S1200 of FIG. 11, more specifically, a series of sheet feeding control processing for changing the sheet setting to a sheet holding unit designation, and returns to step S1101 of FIG. 11.

Figure 17B:
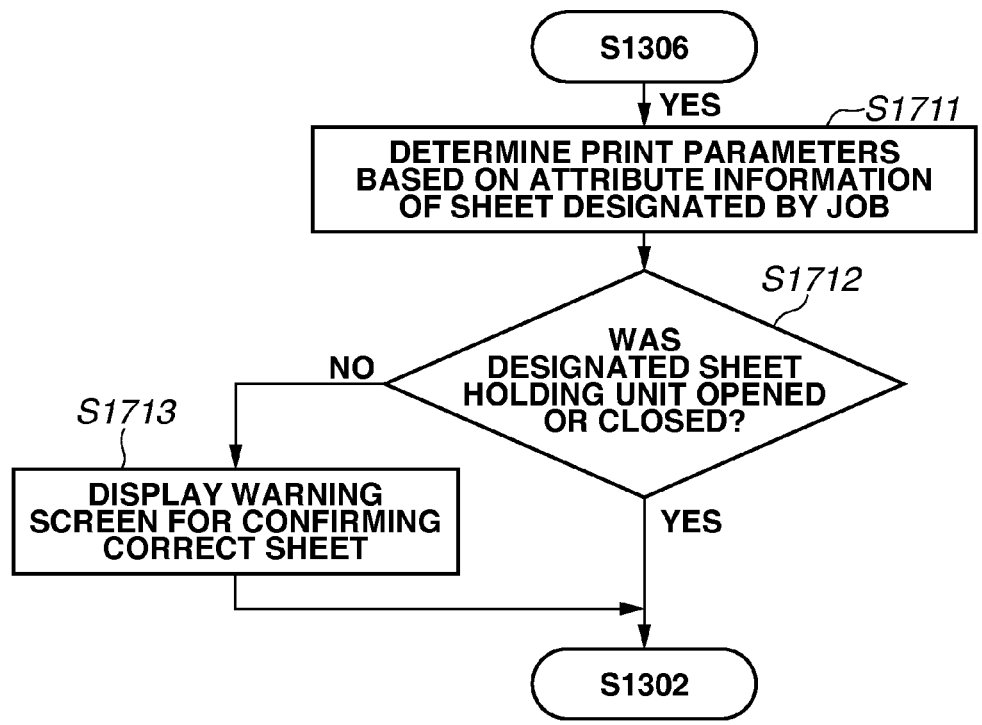

The second exemplary embodiment differs from the first exemplary embodiment in the processing from "YES" in step S1306 of FIG. 13 to the processing for returning to step S1302. The processing from "YES" in step S1306 of FIG. 13 to the processing for returning to step S1302 according to the second exemplary embodiment will be described in detail below with reference to the flowchart illustrated in FIG. 17B.

When the CPU 212 determines that the sheet is set to change to a sheet holding unit designation (YES in step S1306), then in step S1711, the CPU 212 determines print parameters based on the attribute information of the sheet designated by the job. Referring to the example illustrated in FIG. 14C, while a mismatch sheet "A4 THICK PAPER 1" has been changed to a sheet holding unit designation of "SHEET HOLDING UNIT 2", print parameters are determined based on the attribute information of "A4 THICK PAPER" designated by the job.

Figure 18:
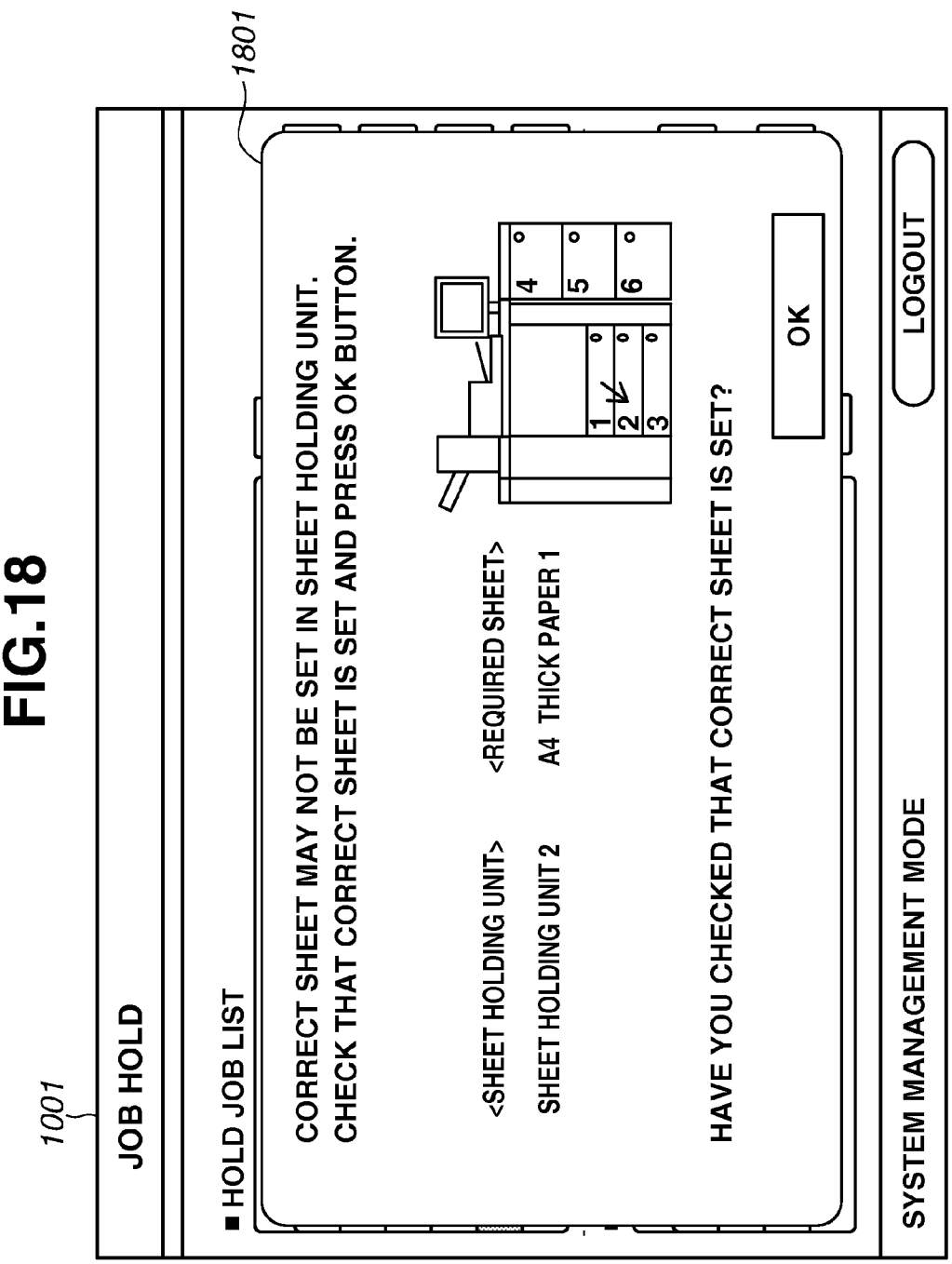
FIG. 18 illustrates an example of a warning screen displayed on the operation unit of the digital printer according to the second exemplary embodiment.

Then in step S1712, the CPU 212 determines whether the designated sheet holding unit has been opened and closed. When the CPU 212 determines that the designated sheet holding unit has not been opened and closed (NO in step S1712), then in step S1713, the CPU 212 displays on the operation unit 204 a warning screen 1801 for prompting the user to make sure that the correct sheet is set to the sheet holding unit, as illustrated in FIG. 18, and returns to step S1302. On the other hand, when the CPU 212 determines that the designated sheet holding unit has been opened and closed (YES in step S1712), the CPU 212 returns to step S1302.

Figure 17C:
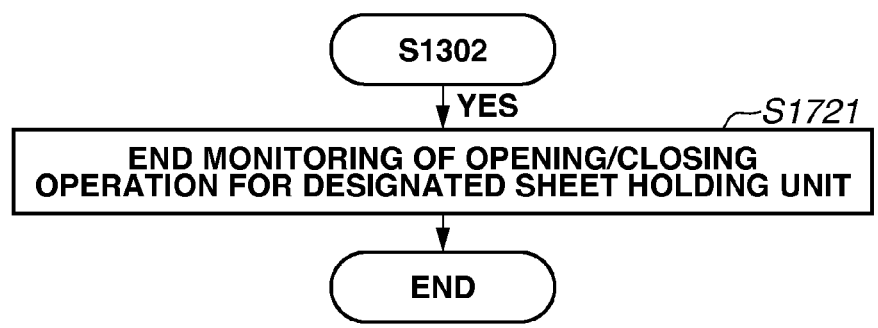

The second exemplary embodiment further differs from the first exemplary embodiment in the processing after "YES" in step S1302 of FIG. 13. The processing after "YES" in step S1302 of FIG. 13 according to the second exemplary embodiment will be described in detail below with reference to the flowchart illustrated in FIG. 17C.

When the CPU 212 determines that the print parameter determination has been made for all of sheets to be used by the job (YES in step S1302), the CPU 212 proceeds to step S1721.

In step S1721, the CPU 212 ends monitoring the opening/closing operation of the designated sheet holding unit, and then ends the printing control processing for determining print parameters which are used when a job starts printing.

The above is a detailed description of processing performed by the second exemplary embodiment which is different from the first exemplary embodiment.

As described above, in the second exemplary embodiment, when the attribute information of a sheet to be used by a print job is not registered in any sheet holding unit, the CPU 212 changes the sheet feeding source information of the mismatch sheet from a sheet type designation to a sheet holding unit designation. This can resolve the media mismatch state, and the user can confirm the relevant situation. Further, print parameters can be determined based on the attribute information of a sheet designated by the job.

In the second exemplary embodiment, when the sheet holding unit has not been opened or closed before execution of printing for the job of the sheet changed to a sheet holding unit designation, the CPU 212 displays the warning screen 1801 for prompting the user to make sure that the correct sheet (sheet designated by the job) is stored in the relevant sheet holding unit. This can prevent the user from forgetting to store the sheet designated by the job in the sheet holding unit at the time of printing, and make the user obtain the desired print product.

In the above-described second exemplary embodiment, the CPU 212 determines print parameters based on the attribute information of the sheet designated by the job, and performs printing on the sheet designated by the job. Therefore, the CPU 212 temporarily replaces the sheet stored in the designated sheet holding unit by the sheet designated by the job.

Therefore, in the third exemplary embodiment, after the CPU 212 determines print parameters based on the attribute information of the sheet designated by the job, the CPU 212 displays a warning screen 1901 as illustrated in FIG. 19 on the operation unit 204 after completion of printing on the sheet designated by the job, in addition to the processing according to the second exemplary embodiment.

Displaying the warning screen 1901 after the completion of printing in this way enables the user to replace the sheet currently stored in the designated sheet holding unit by the sheet having been originally stored in the relevant sheet holding unit. The sheet currently stored in the designated sheet holding unit is the sheet designated by the job. The sheet having been originally stored in the designated sheet holding unit is the sheet registered as setting values for the relevant sheet holding unit.

As described above, in the third exemplary embodiment, the CPU 212 prompts the user to confirm sheet replacement after completion of printing, thus preventing the user from failing to obtain the desired print product because of failure to perform sheet replacement when another job is executed.

The present invention is not limited to the above-described exemplary embodiments, and can be modified in diverse ways (including organic combinations of these exemplary embodiments) without departing from the spirit and scope thereof. These modifications are not excluded from the scope of the present invention.

Although, in the present exemplary embodiment, the CPU 212 of the controller unit 205 in the digital printer 102 serves as an entity of the above-described various control, a part or whole of the above-described various control may also be executable by a print control apparatus, such as an external controller provided separately from the digital printer 102.

While the present invention have specifically been described based on the above-described exemplary embodiments, for those skilled in the art, the spirit and scope of the present invention are not limited to specific descriptions given in the specification.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-172351 filed Aug. 22, 2013, and No. 2014-082019 filed Apr. 11, 2014 which are hereby incorporated by reference herein in their entirety.

What is claimed is:

1. A printing apparatus which is able to print an image on a sheet conveyed from a sheet holding unit, the printing apparatus comprising:
   a storing unit configured to store sheet attribute information of sheets stored in the sheet holding unit;
   a holding unit configured to hold a job;
   a first receiving unit configured to receive a first instruction to execute the job held in the holding unit;
   a second receiving unit configured to receive a second instruction for determining whether attribute information of sheets designated by the job corresponds to the sheet attribute information stored in the storing unit;
   a determining unit configured to determine, before the first receiving unit receives the first instruction, whether the attribute information of sheets designated by the job corresponds to the sheet attribute information stored in the storing unit, based on the second instruction received by the second receiving unit;
   a first notification unit configured to notify, based on the determination by the determining unit that the attribute information of sheets designated by the job does not correspond to the sheet attribute information stored in the storing unit, a user that the attribute information of sheets designated by the job does not correspond to the sheet attribute information stored in the storing unit;

a changing unit configured to change the attribute information of sheets designated by the job; and a second notification unit configured to notify, in accordance with changing the attribute information of sheets designated by the job into the sheet attribute information stored in the storing unit by the changing unit, the user that the attribute information of sheets designated by the job corresponds to the sheet attribute information stored in the storing unit.

2. The printing apparatus according to claim 1, wherein, without the determining unit further performing a determination, the second notification unit notifies the user that the attribute information of sheets designated by the job corresponds to the sheet attribute information stored in the storing unit.

3. The printing apparatus according to claim 1, wherein, in a state where the first notification unit stops notifying the user that the attribute information of sheets designated by the job does not correspond to the sheet attribute information stored in the storing unit, the second notification unit notifies the user that the attribute information of sheets designated by the job corresponds to the sheet attribute information stored in the storing unit.

4. The printing apparatus according to claim 1, further comprising a feed control unit configured to perform, in accordance with changing the attribute information of sheets designated by the job into the sheet attribute information stored in the storing unit by the changing unit, control to feed a sheet from the sheet holding unit.

5. The printing apparatus according to claim 1, wherein, in a case where a sheet is not stored in the sheet holding unit, the changing unit cannot change the attribute information of sheets designated by the job into the sheet attribute information stored in the storing unit.

6. The printing apparatus according to claim 1, further comprising a printing control unit configured to control, in a case where the changing unit changes the attribute information of sheets designated by the job into the sheet attribute information stored in the storing unit, print processing based on the sheet attribute information stored in the storing unit.

7. The printing apparatus according to claim 1, wherein the attribute information includes at least one of sheet size, sheet grammage, sheet surface property, sheet shape, and sheet color.

8. A printing apparatus which is able to print an image on a sheet conveyed from a sheet holding unit, the printing apparatus comprising:

a storing unit configured to store sheet attribute information of sheets stored in the sheet holding unit;

a holding unit configured to hold a job;

a first receiving unit configured to receive a first instruction to execute the job held in the holding unit;

a second receiving unit configured to receive a second instruction for determining whether attribute information of sheets designated by the job corresponds to the sheet attribute information stored in the storing unit;

a determining unit configured to determine, before the first receiving unit receives the first instruction, whether the attribute information of sheets designated by the job corresponds to the sheet attribute information stored in the storing unit, based on the second instruction received by the second receiving unit;

a notification unit configured to notify, based on the determination by the determining unit that the attribute information of sheets designated by the job does not correspond to the sheet attribute information stored in the storing unit, a user that the attribute information of sheets designated by the job does not correspond to the sheet attribute information stored in the storing unit; and a changing unit configured to change the attribute information of sheets designated by the job, wherein the notification unit stops notifying, in accordance with changing the attribute information of sheets designated by the job into the sheet attribute information stored in the storing unit by the changing unit, the user that the attribute information of sheets designated by the job does not correspond to the sheet attribute information stored in the storing unit.

9. A non-transitory computer readable storage medium storing a computer program to cause a printing apparatus which is able to print an image on a sheet conveyed from a sheet holding unit, to perform a method, the method comprising:

storing sheet attribute information of sheets stored in the sheet holding unit;

holding a job in a holding unit;

receiving a first instruction to execute the job held in the holding unit;

receiving a second instruction for determining whether attribute information of sheets designated by the job corresponds to the stored sheet attribute information;

determining, before the first instruction is received, whether the attribute information of sheets designated by the job corresponds to the stored sheet attribute information, based on the received second instruction;

notifying, based on the determination that the attribute information of sheets designated by the job does not correspond to the stored sheet attribute information, a user that the attribute information of sheets designated by the job does not correspond to the stored sheet attribute information;

changing the attribute information of sheets designated by the job; and notifying, in accordance with changing the attribute information of sheets designated by the job into the stored sheet attribute information, the user that the attribute information of sheets designated by the job corresponds to the stored sheet attribute information.

10. A printing apparatus which executes a job for printing an image on a sheet conveyed from a sheet holding unit, the printing apparatus comprising:

a determining unit configured to determine, based on a user instruction, whether attribute information of the sheet designated by the job corresponds to sheet attribute information of the sheet held in the sheet holding unit;

a displaying unit configured to display a determination result by the determining unit; and a changing unit configured to change, based on a user instruction, the attribute information of the sheet designated by the job, wherein the display unit updates the determination result in response to changing the attribute information of sheet by the changing unit.

11. The printing apparatus according to claim 10, wherein the displaying unit is configured to display, based on the determination by the determining unit that the attribute information of the sheet designated by the job does not correspond to the sheet attribute information of the sheet held in the sheet holding unit, information indicating that the attribute information of the sheet designated by the job does not correspond to the sheet attribute information of the sheet held in the sheet holding unit.

12. The printing apparatus according to claim 11, wherein the display unit is configured to stop displaying the determination result in response to changing the attribute information of sheet by the changing unit.

13. The printing apparatus according to claim 10, wherein the changing unit changes the attribute information of the sheet designated by the job into attribute information of a sheet held in the sheet holding unit.

14. The printing apparatus according to claim 10, further comprising
a holding unit configured to hold the job; and
a receiving unit configured to receive, from a user, an execution instruction for executing the job held in the holding unit,
wherein the printing apparatus executes the job based on the execution instruction received by the receiving unit, and
wherein the determining unit is configured to determine, based on a user instruction before the printing apparatus executes the job, whether the attribute information of the sheet designated by the job corresponds to sheet attribute information of the sheet held in the sheet holding unit.

15. The printing apparatus according to claim 10, wherein the attribute information includes at least one of sheet size, sheet grammage, sheet surface property, sheet shape, and sheet color.

16. A printing apparatus which executes a job for printing an image on a sheet conveyed from at least one of a plurality of sheet holding units, the printing apparatus comprising:
a holding unit configured to hold the job;
a receiving unit configured to receive an execution instruction to execute the job held in the holding unit;
a determining unit configured to determine, based on a user instruction and before the receiving unit receives the execution instruction, whether attribute information of the sheet designated by the job corresponds to sheet attribute information of sheets held in the plurality of sheet holding units;
a displaying unit configured to display, based on the determination by the determining unit that the attribute information of the sheet designated by the job does not correspond to the sheet attribute information of sheets held in the plurality of sheet holding units, information indicating that the attribute information of the sheet designated by the job does not correspond to the sheet attribute information of sheets held in the plurality of sheet holding units; and
a selecting unit configured to select, from the plurality of sheet holding units based on a user instruction, a sheet holding unit from which the sheet designated by the job is to be conveyed,
wherein the display unit stops displaying the information in accordance with selection of the sheet holding unit by the selecting unit without further determination by the determining unit.

17. The printing apparatus according to claim 16, further comprising a changing unit configured to change, based a user instruction, attribute information of the sheet designated by the job without selecting the sheet holding unit by the selecting unit,
wherein the display unit stops displaying the information based on further determination by the determining unit in a case where the attribute information of the sheet designated by the job is changed by the changing unit.

18. The printing apparatus according to claim 16, wherein the attribute information includes at least one of sheet size, sheet grammage, sheet surface property, sheet shape, and sheet color.

* * * * *